(12) United States Patent
Patel

(10) Patent No.: US 11,912,845 B2
(45) Date of Patent: Feb. 27, 2024

(54) IN-SITU GENERATION OF NUCLEATING AGENTS FOR INDICATING DEVICES

(71) Applicant: JP Laboratories, Inc., Middlesex, NJ (US)

(72) Inventor: Gordhanbhai N. Patel, Somerset, NJ (US)

(73) Assignee: JP Laboratories, Inc., Middlesex, NJ (US)

( * ) Notice: Subject to any disclaimer, the term of this patent is extended or adjusted under 35 U.S.C. 154(b) by 0 days.

(21) Appl. No.: 17/865,932

(22) Filed: Jul. 15, 2022

(65) Prior Publication Data

US 2023/0023862 A1 Jan. 26, 2023

Related U.S. Application Data

(60) Provisional application No. 63/224,569, filed on Jul. 22, 2021.

(51) Int. Cl.
| | | |
|---|---|---|
| *C08K 3/16* | (2006.01) | |
| *C08K 3/08* | (2006.01) | |
| *G01K 11/06* | (2006.01) | |

(52) U.S. Cl.
CPC ............... *C08K 3/16* (2013.01); *C08K 3/08* (2013.01); *G01K 11/06* (2013.01)

(58) Field of Classification Search
CPC .... C08K 3/16; C08K 3/08; C08K 2003/0806; C09K 5/08; C09K 5/10; C09K 5/066
See application file for complete search history.

(56) References Cited

U.S. PATENT DOCUMENTS

| 5,785,885 A * | 7/1998 | Kakiuchi ............... C09K 5/063 252/70 |
| 7,022,471 B2 * | 4/2006 | Ohnuma ............ G03C 1/49809 430/617 |
| 2002/0058220 A1 * | 5/2002 | Tsukada ............. G03C 1/49863 430/350 |
| 2006/0265814 A1 * | 11/2006 | Ritter .................... D06M 15/01 8/115.51 |

OTHER PUBLICATIONS

Inada et al. "Inactivation of ice nucleating activity of silver iodide by antifreeze proteins and synthetic polymers", J. Phys. Chem. B, 2012, 116, 5364-5371. Published Apr. 16, 2012. (Year: 2012).*

* cited by examiner

*Primary Examiner* — Jane L Stanley
(74) *Attorney, Agent, or Firm* — Joseph T. Guy; Patent Filing Specialist Inc.

(57) ABSTRACT

A nucleating agent composition, a method of forming the nucleating agent and a device comprising the nucleating agent composition are provided. The nucleating agent comprises a nucleating agent comprises silver halide salt with an average particle size of at least 10 nanometer to no more than 100 microns in a polymeric matrix wherein the polymeric matrix has a viscosity of at least 500 cP to no more than 50,000 cP.

14 Claims, 8 Drawing Sheets

IN-SITU GENERATION OF NUCLEATING AGENTS FOR INDICATING DEVICES

CROSS-REFERENCE TO RELATED APPLICATIONS

This application claims the priority of pending U.S. Provisional Application No. 63/224,569 filed Jul. 22, 2021 which is incorporated herein by reference.

FIELD OF THE INVENTION

The present invention is related to an indicator device and a method of in-situ generation of nucleating agents, such as silver halides, for use in indicating devices such as freeze indicators.

BACKGROUND

Many perishables, such as sera and vaccines get spoiled, deteriorate or lose quality if they suffer even a brief exposure to a temperature near or below freezing. Many produce, such as bananas, turn brown and become mushy. Some flowers, salad greens and herbs, such as basil; wilt, shrink and become dark colored, useless and/or unappealing when exposed to freezing or near-freezing temperatures. Other examples where cooling below the freezing point has a detrimental effect includes foods such as mayonnaise, latex products such as paints, concrete modifiers and laboratory chemicals. Biological materials, such as whole blood, insulin and the like can be seriously affected when subjected to freezing conditions, and this is also true for high value biotechnology drugs containing proteins, enzymes or peptides. Therefore, it is important to the seller, buyer and end user of such products that some indicator means be provided which will signal a change in products caused by cooling conditions.

A number of freeze indicators are disclosed in the patent literature. Many of them are based on change in opacity of an aqueous emulsion, dispersion or latex which become milky white to clear or vice versa. Some of the other freeze indicators are based on destabilization or coagulation of small, nano or micron sized particles and phase separation of organic liquids in water.

Most organic and inorganic liquids show super cooling. Upon cooling, pure water does not freeze at zero degree centigrade. It usually freezes below about −5° C. Water is often a major component of the freeze indicators. To prevent super cooling of water, a nucleating agent is added in the aqueous freeze indicators. A variety of nucleating agents are reported in the literature for freeze indicators. The nucleating agents include organic, inorganic and biological molecules such as non-hazardous microorganisms. The most widely used nucleating agents are silver iodide and microorganisms, such as viruses and bacteria, including *Pseudomonas syringae* and *Erwinia herbicola*.

Nucleating agents for freeze indicators are typically made outside and then added in the temperature indicating formulations, such as freeze indicating formulations. There is no report on in-situ generation of nucleating agents for temperature indicators. Nucleating agents are usually very fine particles such as nano sized particles to particles that are several microns. Smaller particles are more effective in nucleation as the surface area per unit weight is higher. It is often not possible, or very difficult, to generate nucleating agents in-situ, especially for biological nucleating agents such as microorganism.

Silver iodide is probably the best and most effective nucleating agent for cloud seeding and for freeze indicators. Silver iodide in the absence of light is very stable. However, temperature indicators are often exposed to, at least, ambient light. Additionally, silver iodide is insoluble in most organic and inorganic solvents including water. Many of the organic and biological nucleating agents, such as microorganisms, have relatively poor stability compared to inorganic nucleating agents such as silver iodide. Less stable nucleating agents, such as microorganisms, require stabilizers and provide lower shelf life. They are also prevented from using a solvent or additive which can affect the organic and biological nucleating agents. Organic and biological nucleating agents also require biocides to prevent biological growth such as fungus. Inorganic nucleating agents, like silver iodide, are stable and do not require biocides.

It is very difficult to manufacture nano and micron sized particles of silver iodide, then store them and then keep them from coagulating or settling at the bottom of a freeze indicating device because silver iodide has a density of 5.67 g/cc which is much higher than the density of water which is 1 g/cc. Hence, there is a need to make fine particles of silver iodide in-situ. Additionally, silver iodide is light sensitive and turns gray upon prolonged exposure to ambient light, UV light and sunlight. Hence, there is a need to make silver iodide crystals insensitive to light.

In spite of the extensive efforts there is still a need for nucleating agent systems and methods of making such systems for temperature indicators, such as freeze and thaw indicators, which are stable, have high surface area and long shelf life, are very effective and/or unaffected by ambient conditions such as light. The currently commercially available freeze indicating devices take very long, such as 10-30 minutes, and do not undergo complete uniform change from clear to opaque. They also require rubbing the indicator to see the change which is highly undesirable.

Provided herein is an improved temperature indicating device based on in-situ generation of nucleating agents.

SUMMARY OF THE INVENTION

It is an objective of the invention to provide a method and a system for in-situ generation of nucleating agents which are particulary suitable for use in temperature indicators, such as freeze and thaw indicators.

It is another objective of the invention to provide a method and a system for in-situ generation of nucleating agents for use in temperature indicators, such as freeze and thaw indicators, which are easy to manufacture, stable over time, have high surface area, long shelf life, which are very effective and/or unaffected by ambient conditions such as light.

Yet another objective of the invention is to provide a method and a system for in-situ generation of nucleating agents, such as silver iodide which are particularly suitable for use in temperature indicators, such as freeze and thaw indicators.

Yet another objective is to develop in-situ made nucleating agent system which can be used for temperature indicators, such as freeze indicating systems.

Yet another objective is to develop a method to produce fine, nano to micron sized particles of nucleating agents, such as silver halides, particularly silver iodide.

Yet another objective is to produce fine particles of nucleating agents by mixing the reactants in a very viscous aqueous or non-aqueous polymeric matrix.

Yet another objective is to produce fine particles of nucleating agents by dissolving the reactants separately in a very viscous or nearly solid polymeric matrix, such as gel, and mixing at high speed to in-situ generate fine particles of nucleating agents.

Yet another objective is to produce fine particles of silver halide, such as silver iodide, by dissolving the reactants, such as silver nitrate, in a viscous polymeric medium in one pot with a halide salt, such as potassium iodide, preferably in the same viscous polymeric medium but in another pot and then mixing them at high speed to form fine dispersion of silver halides, such as silver iodide, in the viscous polymeric nucleating matrix.

Yet another objective is to produce fine particles of silver halide, such as silver iodide by dissolving the reactants, such as silver nitrate, in a solvent such as water, with or without a binder, in one pot and a halide salt, such as potassium iodide, preferably in the same solvent system but in another pot, freezing them to solid state and mixing them at high speed by crushing them into fine power and raising the temperature due to high speed stirring to form a fine dispersion of fine particles of silver halides, such as silver iodide in water or in the binder solution.

Yet another objective is to use water soluble natural and synthetic polymers as a binder, matrix or medium.

Yet another objective is to use water soluble or swellable, polymers, preferably, very high molecular weight polymers, such as 500,000 Daltons or higher, which have the ability to form very viscous solution or soft gels.

Yet another objective is to use water soluble natural and synthetic polymers, such as agar gelatin, guar gum, starch and polyvinyl alcohol.

Yet another objective is to use water soluble and organic solvent soluble natural and synthetic polymers as a matrix.

Yet another objective is to use water and organic solvent soluble natural and synthetic polymers such as polyethylene oxide, polyacrylamide and natural gums such as guar gum.

Yet another objective is to increase the effectiveness of nucleating agents by co-crystallization, co-formation or doping the nucleating agent.

Yet another objective is to increase the effectiveness of silver halide nucleating agent by co-crystallization, co-formation or doping of silver halides including silver iodide, silver chloride and silver bromide.

Yet another objective is to increase the effectiveness of nucleating agents by co-crystallization, co-formation or doping the nucleating agent with one or more doping agents.

Yet another objective is to increase the effectiveness of silver halide nucleating agent by reacting silver nitrate with a mixture of potassium iodide and potassium chloride.

Yet another objective is to increase the effectiveness and chemical stability, thermal stability and light stability of silver halide based nucleating agents by reacting with both cationic and anionic dopants.

Yet another objective is to minimize the photo reactivity of silver halide nucleating agents.

Yet another objective is to minimize the photo reactivity of silver halide nucleating agents by co-crystallization and doping of silver halide nucleating agents with divalent or higher valent metal salts, such as that of aluminum, barium, calcium, cadmium, copper, magnesium, nickel, tin and zinc. For example, chloride, bromide and iodide of aluminum, copper, magnesium, nickel, tin and zinc.

Yet another objective is to minimize the photo reactivity of silver halide nucleating agents by adding UV absorbers and reducing agents, such as hydroquinone.

Yet another objective is to make and add in-situ made nucleating agents in freeze indicating formulations and devices.

Yet another objective is to prevent fungus growth freeze indicating formulation containing water and organic polymers such as polyvinyl alcohol, agar and gelatin by adding a biocide such as a fungicide (mold inhibitor).

Yet another objective is to add small amounts of water miscible aliphatic, aromatic, acyclic/alicyclic, and heterocyclic organic solvents, such as alcohols, ethers, esters and ketones to reduce biological growth, such as fungus and molds in water soluble polymers.

Yet another objective is to add a in-situ generated nucleating system in freeze indicators containing microcapsules, emulsions, colloids, dispersions, dyes, polymeric latexes and color developing monomers.

Yet another objective is to add an in-situ generated nucleating system in temperature indicators, such as freeze indicators based on a phase change, phase reversal, phase separation, dissolution of indicators, coagulation, opaque or translucent becoming clear or vice versa, rapid crystallization, rapid polymerization of diacetylenes, rupturing of microcapsules, pH change, mixing of different phases, separation of mixed phases, destabilization of emulsions, or latexes or undergoing a color changing.

Yet another objective is to provide more than one nucleating agent of different natures to be more effective in rapid freezing.

Yet another objective is to create fine particles of silver halide on and around colloidal particles such as that of cellulose in a binder such as carboxy methyl cellulose.

Yet another objective is to create fine particles of silver halide in water soluble polymers or thickeners; such as starch, guar gum, polyethylene oxide, polyacrylic acid, polyacrylamide, hydroxy ethyl cellulose and carboxy methyl cellulose containing colloidal particles such as that of cellulose.

Yet, another objective is to make a freeze indicator which undergoes, preferably a dramatic color change (e.g., blue-to-red), abruptly within a minute and within a very narrow temperature range (e.g., ±1° C.).

These and other advantages, as will be realized herein, are provided in a nucleating agent composition comprising:
a nucleating agent comprising silver halide salt with an average particle size of at least 10 nanometer to no more than 100 microns in a polymeric matrix wherein the polymeric matrix has a viscosity of at least 500 cP to no more than 50,000 cP.

Yet another embodiment is provided in a method for forming a nucleating agent composition comprising:
forming a first phase comprising silver nitrate in a viscous first polymeric matrix;
forming a second phase comprising halide salt in a viscous second polymeric matrix wherein the first phase and second phase independently have a viscosity of at least 500 cP to no more than 50,000 cP
mixing the first phase and second phase wherein upon mixing the silver nitrate and halide salt form silver halide and wherein the first polymeric matrix and second polymeric matrix are taken together to form a homogenous third polymeric matrix comprising silver halide wherein the silver halide has an average particle size of at least 1 nanometer to no more than 100 microns.

Yet another embodiment is provided in a freeze indicating device comprising an indicator; a nucleating agent composition comprising a nucleating agent in a polymeric matrix wherein the nucleating agent has an average particle size of at least 10 nanometer to no more than 100 microns and the polymeric matrix has a viscosity of at least 500 cP to no more than 50,000 cP; and an activator medium comprising an activator wherein the activator is dissolved in the activator medium above an activation temperature; and wherein at or below the activation temperature the activator medium freezes in presence of nucleating agent and the activator separates from the activator medium to form separated activator wherein the separated activator reacts with the indicator to form reacted indicator.

Yet another embodiment is provided in a method for making a freeze indicating device comprising:

forming an indicator;

forming a nucleating agent composition comprising a nucleating agent in a polymeric matrix; and forming an activator matrix comprising an activator wherein the activator is dissolved in the activator matrix above an activation temperature and wherein at or below the activation temperature the activator matrix freezes in presence of the nucleating agent and the activator separates from the activator matrix to form separated activator wherein the separated activator reacts with the indicator to from reacted indicator.

DESCRIPTION

Figure 1:
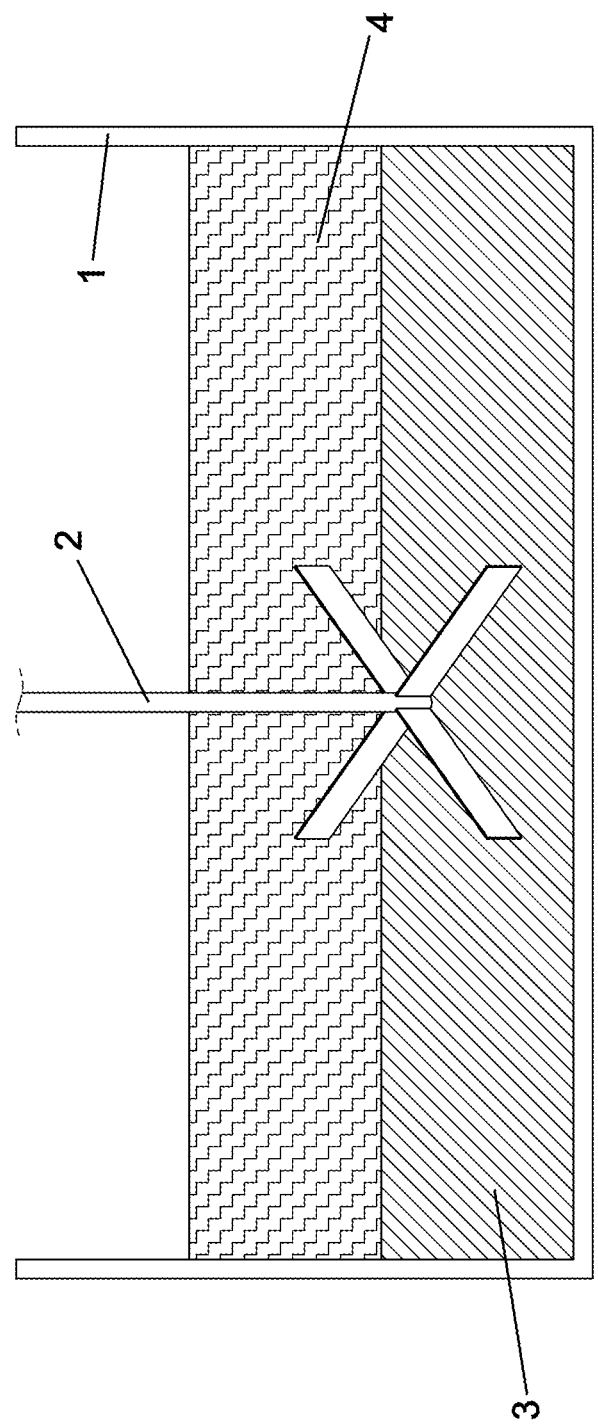
FIG. 1 is a schematic presentation of an apparatus for in-situ generation of fine particles of a nucleating agent by reacting two reactants in form of very thick, viscous solutions or gels, before vigorous stirring.

Provided herein is a nucleating agent composition and method of making such a composition which is particularly suitable for use in temperature indicators, such as freeze and thaw indicators. The nucleating agent of the composition is stable, has high surface area and long shelf life. Furthermore, the temperature indicators made by using the nucleating agents are very effective and/or unaffected by ambient conditions, such as light, which extends the stability of the temperature indicator significantly, To be an effective and reliable freeze indicator, the indicator must undergo a noticeable change within very short time, such as within a few minutes and preferably within a minute, of reaching freezing temperature. The indication of freezing by the indicator must occur within a narrow temperature range, such as within a few degrees centigrade, and preferably within one degree centigrade of freezing, or activation, temperature. Throughout the specification the term freezing temperature and activation temperature will be used interchangeably. Freezing temperature is typically the freezing temperature without perturbation whereas activation temperature accounts for the inclusion of various components which can raise or lower the unperturbed freezing point of the material referred to.

A particular advantage of the instant invention is the ability to provide a freeze indicator which undergoes an observable color change, and preferably a dramatic color change such as blue-to-red, abruptly, such as within a minute, and within a very narrow temperature range such as ±1° C.

An activator is an acid, base or solvent which introduces a noticeable change, such as a change in color or fluorescence, in an indicating material such as a pH dye or a partially polymerized diacetylene upon activation.

Diacetylene(s) are conjugated diacetylenes which function as a particularly preferred indicator having chemical formula R—C≡C—C≡C—R, wherein R is a substituent group.

The term "fine particles" refers to solid particles having an average particle size of 1 nanometer to about 100 microns, more preferably 10 nm to 10 microns and most preferably 10 nm to 1 micron.

The term "freeze indicator" refers to a formulation or a device which undergoes a noticeable change. The noticeable change can be a change in color or fluorescence or a change in phase or state, such as liquid to solid, when subjected to a lowering temperature.

The term "heavy water" is used to refer to $D_2O$ having a molar mass of 20 g/mole.

The term "in-situ" with reference to the in-situ formation of a polymeric nucleating matrix refers to the formation of the nucleation agent, preferably a silver halide and most preferable silver iodide, directly within the matrix it is to be utilized in. By way of example, the silver iodide would be made in-situ by combining a first reactive material, comprising an iodide salt in a polymeric matrix as a first phase, with a second reactive material, comprising a halide salt in a polymeric matrix as a second phase, wherein the silver ion and halide ion react upon mixing of the phases to form silver halide within the polymeric matrices of the first phase and second phase combine to form a homogenous third phase wherein the silver halide remains in the homogenous third phase. The silver halide in the polymeric homogenous third phase is referred to as a nucleating agent composition.

An indicator is a composition, such as a pH dye or a partially polymerized diacetylene which undergoes a noticeable change, such as a change in color or fluorescence when contacted with an activator such as an acid, base or a solvent.

An indicating system is a system which indicates the status of something such as temperature indicators, particularly freeze indicator.

A partially polymerized diacetylene (PPD) is a diacetylene which is not fully polymerized, such as below ~50 mol % polymerization.

The terms "photo sensitivity", "light sensitivity" and "radiation sensitivity" or "ionizing radiation sensitivity" are used interchangeably herein.

Silver halide based nucleating agent(s) and doped nucleating agent(s) are nucleating agents, such as in-situ generated silver halides, specifically silver iodide, that are doped with chloride, bromide and other divalent or higher-valent metal ions.

The term "temperature indicator(s)" is used to refer to those formulations and devices which undergo a noticeable change, such a change in color, opacity and fluorescence either during ascending or descending of temperature change.

The term "water" is used for light water, $H_2O$ having a molar mass of 18 g/mole. The term is used for ambient water.

The following terms are used interchangeably: (i) seed/seeding and nucleating agent/nucleation, (ii) phase change (such as liquid to solid), freezing and solidification, (iii) polymer and binder and (iv) crystals and particles.

When cooled, pure water does not freeze at its melting point of 0° C. Water, supercools and solidifies usually below minus 4° C. Water can be easily supercooled to about minus 10° C. If a nucleating agent is used, water can be frozen at minus 4° C. within minutes. Freeze indicating devices should undergo a noticeable color change within a few minutes and within ±1° C. when cooled below 0° C. Commercially available devices usually require more than 10 minutes and undergo some supercooling before they undergo a noticeable change even though they use nucleating agents. Hence, there is a need for a very effective nucleating agent which makes water freeze within a few minutes, and within ±1° C., when cooled below 0° C. Silver iodide is known to be the most effective nucleating agent. Silver iodide is not sufficiently effective when added in the freeze indicating devices and it is light sensitive. Hence, there is a need for in-situ making of silver iodide, and other silver halide, based nucleating agents for the freeze indicating and other temperature indicating devices.

To obtain maximum surface area, the particles of the nucleating agents should be as small and as rough surface as possible. In order to get small particles of silver iodide, a highly viscous polymeric solution of dilute silver nitrate, as a first reactant mixture in a first phase, is mixed with a highly viscous polymeric solution of dilute potassium iodide, as a second reaction mixture in a second phase, at a very high speed of mixing to minimize the growth of resultant silver iodide crystals.

In situ generated nucleating agents are preferred because they remain stable and do not undergo any deformation or changes during drying or milling.

An inventive method for in-situ generation of silver halide particles is provided herein which is very effective for forming nucleating agent for freeze indicating devices. Silver iodide is doped with other halides, such as chloride and bromide, to make mixed silver halides and further with divalent and higher-valent metals to render the mixed silver halides essentially insensitive to light. The result is a mixture comprising silver salts comprising silver iodide and at least one of silver bromide or silver chloride salts and chloride, bromide or iodide of divalent and higher valent metals. For example, highly effective nucleating agents can be produced for freeze indicating devices by high-speed mixing of a highly viscous aqueous solution of carboxymethyl cellulose containing silver nitrate, as a second reaction mixture, with another highly viscous aqueous solution of carboxymethyl cellulose containing a sodium iodide, as a first reaction mixture, wherein the first reaction mixture may further comprise small quantities of sodium chloride and a divalent salt such as calcium chloride. The resultant suspension is not sensitive to ambient light and freezes within a couple of minutes at minus 5° C. By contrast, a sample without the suspension of silver halide nucleating agents alone takes about five to ten minutes to freeze at about minus 9° C.

The doping anion for silver iodide can be a metal or non-metal. However, preferred doping anion is that of an alkali metal, alkaline earth metal, transition metal, post transition metal, lanthanide and actinide metal. Preferred doping anions are selected from the group consisting of aluminum, tin, zinc, copper, manganese, magnesium, nickel, cobalt, iron, sodium, potassium, lithium, calcium, gallium, cesium, chromium, germanium, indium, platinum and gold.

The doping cation for the silver iodide nucleating agent can be organic or inorganic. Particularly preferred cations are water insoluble, further preferred are water insoluble inorganic cations such as carbonate, phosphate or sulfate.

Fine particles of a nucleating agent, such as silver iodide, can be obtained by milling large particles by using one of the milling methods, such as ball milling or airjet milling. However, the particle made by these methods are not very effective due to arial oxidation and mechanical shrinkage or deformation of the particles. The cost of a nucleating agent made by these methods is usually high because the nucleating agent needs to be synthesized first, dried and then milled. Additionally, adoption of a rapid change of a nucleating indicating formulation of the nucleating agent is difficult in real life production.

Fine particles of a nucleating agent can be produced by very rapid cooling of its melt or a solution such as by pouring a hot solution of the nucleating agent into liquid nitrogen and filtering the fine particles after thawing to room temperature. By virtue of the rapid cooling and the rapid solidification, the crystals of the nucleating agent do not Ostwald ripen and therefore crystal growth is minimized resulting in fine particles.

All of the above problems can be eliminated or minimized by the in-situ generation of fine particles of nucleating agents, such as silver halides, by reacting two reactants. One reactant would be a second reaction mixture as a second phase comprising potassium iodide and the other reactant would be a first reaction mixture comprising silver nitrate in a very viscous polymeric solution as a first phase. To obtain crystals of a nucleating agent which are fine particles, the reaction between the reactants should occur fast and the growth of the crystals formed must be minimized. This can be achieved if the medium for the reaction is very viscous and the first reactant mixture and second reactant mixture are mixed under very vigorous agitation.

The in-situ generation of fine particles of a nucleating agent will be described with reference to the figures which are an integral component of the specification. Throughout the specification similar elements will be numbered accordingly. The figures are presented for clarity and do not limit the scope of the invention.

Figure 2:
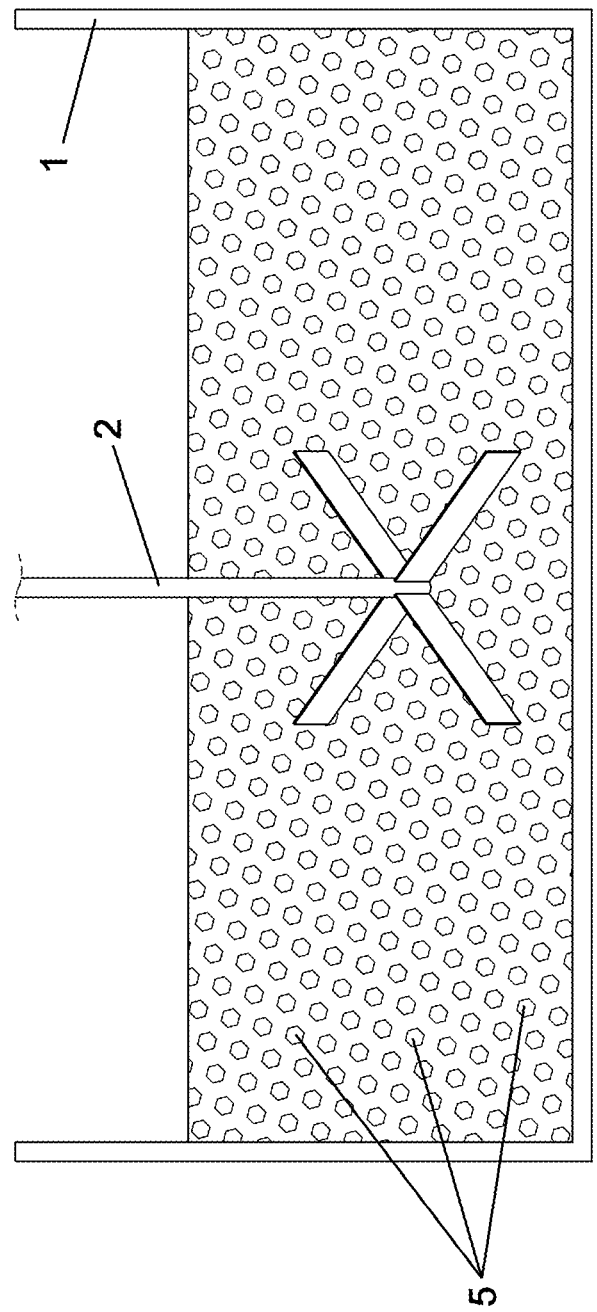
FIG. 2 is a schematic presentation of an apparatus for in-situ generation of fine particles of a nucleating agent by reacting two reactants in form of very thick, viscous solutions or gels after vigorous stirring.

A schematic presentation of an apparatus for an in-situ generation of fine particles of a nucleating agent by reacting the two reactants in a very viscous solution or gel of a polymeric binder is illustrated graphically in FIG. 1 which is before vigorous stirring, and FIG. 2 which is after stirring. A container 1 is loaded with a first reactant mixture, 3, comprising the polymeric binder which is a thick, highly viscous carrier, silver nitrate and water. The highly viscous carrier is preferably thicker than honey and is preferable a gel or paste with a preferred viscosity of 500 to 50,000 cP, more preferably at least 1000 cP to no more than 20,000 cP; in some embodiment more at least 5,000 cP and in some embodiments at least 1,000 to no more than 10,000 cP. In an embodiment the highly viscous carrier is a polymeric binder such as high molecular weight polyethylene oxide molecular weight of at least 4 million g/mole. A second reactant mixture, 4, preferably having a similar viscosity, is added wherein the second reactant mixture comprises the other reactant, such as potassium iodide for the purposes of demonstration of the invention, preferably in the same polymeric binder in water. As illustrated the first reactant mixture and second reactant mixture will not mix readily due to high viscosity. The order of reactant mixtures is illustrated in the order shown for convenience without limit thereto. A mechanical high-speed stirrer, 2, can be in place prior to introduction of the reactant mixtures or introduced to the layered materials. As the mixtures are very viscous, there will be very little mixing and hence there will be very little reaction between silver nitrate and potassium iodide at the interface. The viscous mixtures are mixed at a very high speed sufficient to allow the silver and halide ions to react, such as 20,000 rpm, with a proper mixing blade. The mixing will cause the reaction between silver nitrate and potassium iodide resulting in fine crystals of silver iodide, 5, in a matrix of the polymeric binder which are insoluble in water as shown schematically in FIG. 2. The byproduct will be potassium nitrate. Because of the very high viscosity of the mixtures and very vigorous, high-speed mixing, the resultant particles of silver iodide have very little time to grow to a large size resulting in crystals which are fine particles with high surface area and are therefore suitable for use as nucleating agents in the indicating device.

Figure 3:
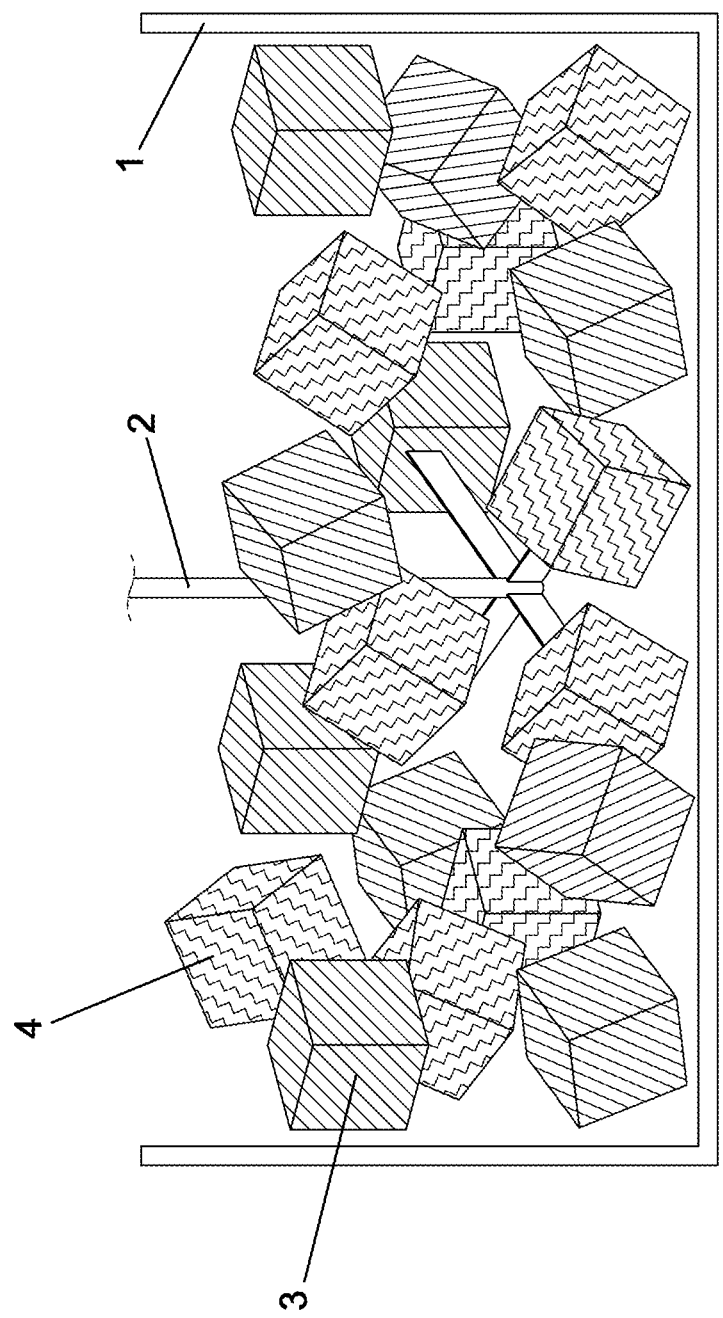
FIG. 3 is a schematic presentation of an apparatus for in-situ generation of fine particles of a nucleating agent by reacting two reactants in form of solid pieces which melt or get dissolved while vigorous stirring and heating.
Figure 4:
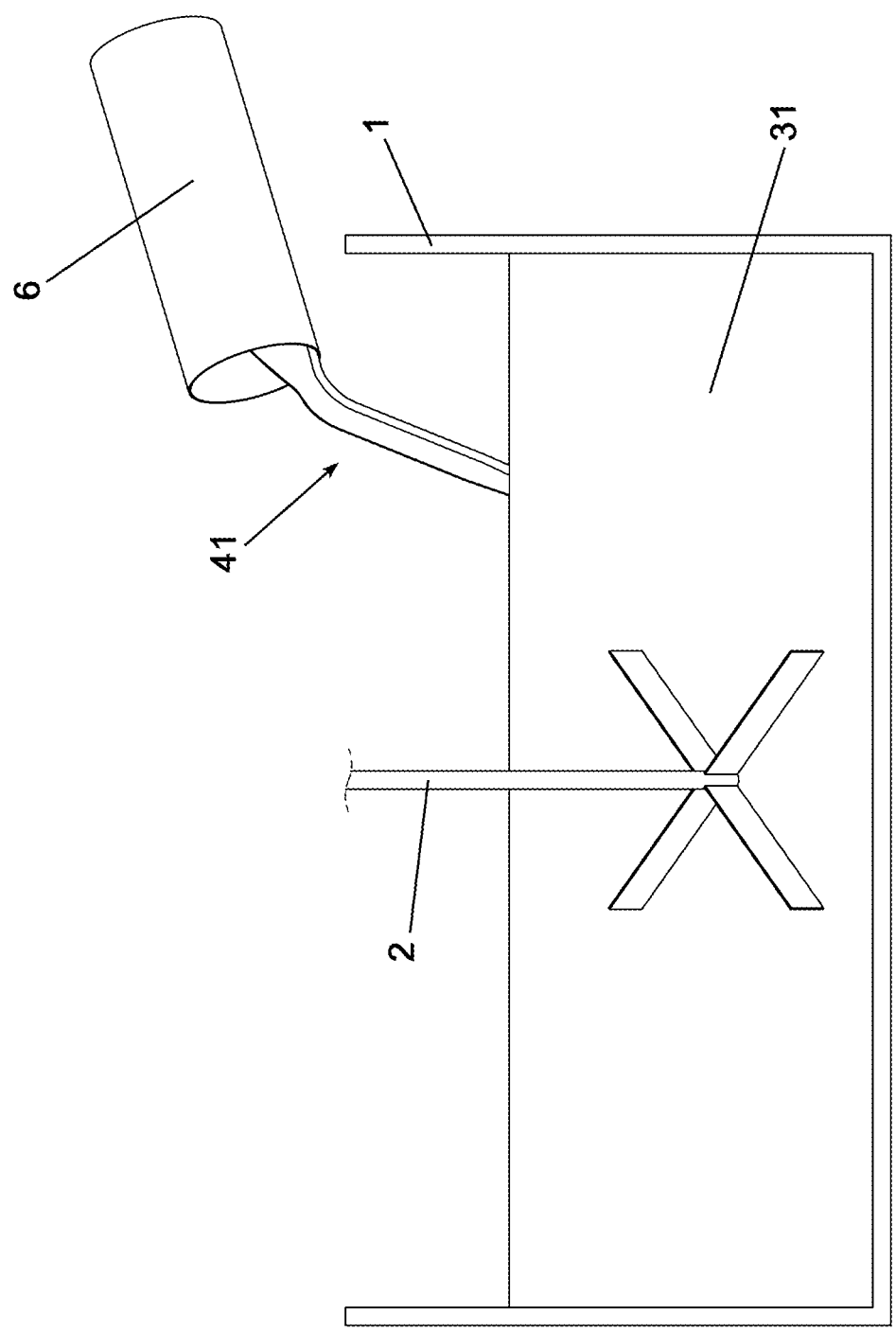
FIG. 4 is a schematic presentation of an apparatus for in-situ generation of fine particles of a nucleating agent by reacting two reactants wherein one reactant in the form of a very viscous solution is added into a very viscous solution of the other reactant while vigorous stirring.
Figure 5:
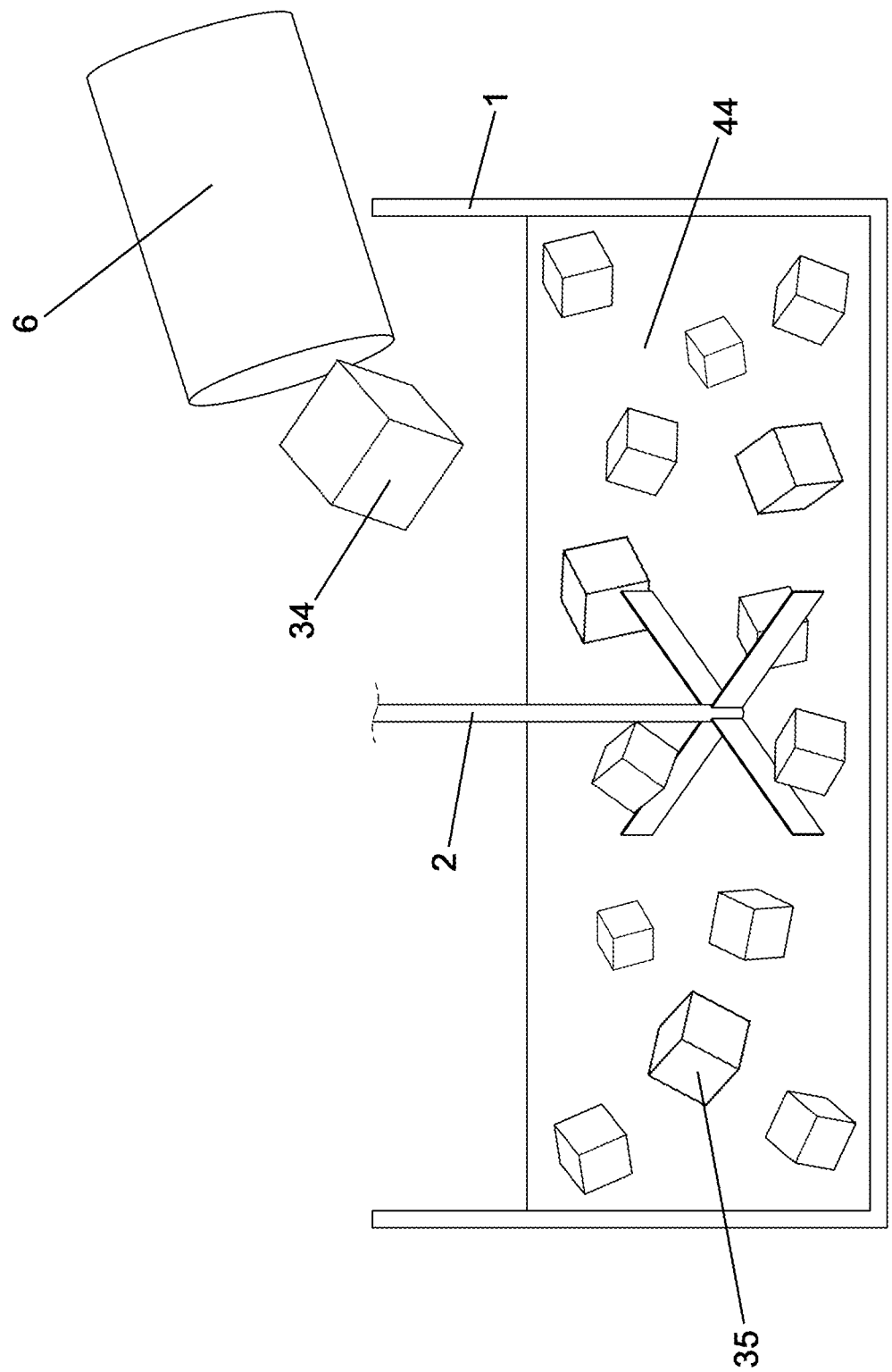
FIG. 5 is a schematic presentation of an apparatus for in-situ generation of fine particles of a nucleating agent by reacting two reactants wherein pieces of a solid reactant are added into a very viscous solution of the other reactant under vigorous stirring.

The particle size of the nucleating agent can be controlled by the nature of the reactants, the reaction rate, the viscosity of the mixtures comprising the reactants, the concentrations of the reactant, the speed with which they are mixed and the temperature of the reaction. Higher viscosity mixtures, lower concentration of the reactants and lower temperature will provide finer particles and vice versa. The method of mixing the first reactant mixture and second reactant mixture can be done by many different ways, for example as shown in FIGS. 3-5 or by mixing the two mixtures from two separate supplies and passing through a long rapid mixing coil or a screw. The most preferred ratio of both the reactants is a 1:1 molar ratio.

As an alternative to the method of FIGS. 1 and 2, viscous reactant mixtures are solids or gels which can be continuously frozen while they are melting due to the energy of mixing. FIG. 3 is a schematic presentation of an apparatus for an in-situ generation of fine particles of a nucleating agent by reacting the first reactant mixture 3 and second reactant mixture 4 to form solid bodies which locally melt or dissolve due to the vigorous stirring wherein the melt can be continuously refrozen. Vigorous stirring produces heat which is countered by a cold environment. This allows local reaction, of the momentarily molten reactants, followed by refreezing.

A further alternative is to add a very viscous reactant mixture, 41, such as the first reactant mixture, from a container 6 into another viscous reactant mixture, 31, such as the second reaction mixture under very vigorous stirring as shown schematically in FIG. 4. FIG. 4 is schematic and it would be realized that the second reaction mixture can be added to the first reactant mixture.

A still further alternative is to add frozen solid pieces of one reactant, 34, such as the first reactant mixture, from a container 6 into a very viscous solution of the other reactant, 44, such as the second reaction mixture, under very vigorous stirring as shown schematically in FIG. 5. Upon vigorous mixing the solid pieces, 35, will slowly dissolved and reduce in size and ultimately completely dissolve or melt. FIG. 5 is schematic and it would be realized that the second reaction mixture can be added to the first reactant mixture referred to herein without deviating from the inventive process.

In an embodiment, the device comprises a transparent housing containing the nucleating agent composition as a very viscous or gel like medium which is preferably a water soluble polymer binder in a host solvent with preferred host solvents being water, heavy water or a mixture thereof. Also optionally dissolved in the host solvent is a freezing point depressant; such as calcium chloride or ethylene glycol; and an activator solvent such as ethylene glycol diacetate, which phase separates when the host solvent is frozen and physically or chemically reacts with an indicator particles, such as a partially polymerized diacetylene or a latex particle. The reaction of the indicator particle and activator introduces a noticeable and/or measurable change such as from blue-to-red or white/translucent-to-clear or vice versa) and a nucleating agent such as in-situ generated fine particles of silver halide and particularly dopped silver iodide. The medium may optionally contain a dispersant, such as a surfactant; a biocid, such as an anti-fungal agent and other additives such as a UV absorber or a heat stabilizer. The activator solvent is miscible with the host solvent above a threshold temperature but phase separates below the threshold temperature.

The indicator particle of the freeze indicator is capable of undergoing a noticeable or measurable change such as a color change when contacted with the phase separated activator solvent. Above the threshold temperature the activator solvent is not in a sufficient concentration to cause the freeze indicator to introduce a change. As the freeze indicator is exposed to temperatures below the threshold temperature, the activator solvent phase separates from the host solvent thereby increasing the concentration of phase separated activator solvent to a concentration sufficient to cause the indicator to undergo a noticeable change, such as a color change. The medium is preferably contained in a blister/cavity/compartment, which is formed by sealing a flexible, clear/transparent window/housing such as a clear plastic film with a base substrate. The base substrate can be made from the same material as clear window or can be composed of a different material. The base substrate and the top clear window can be sealed together such as heat sealed to form a cavity/blister for the indicator medium. The base substrate can be transparent or opaque, which is preferably white but can be of other colors. The base substrate can have a message or barcode printed on its top surface if opaque or on its bottom substrate if it is clear. The base substrate can have a thin layer pressure sensitive adhesive (PSA) and a release liner. The PSA layer allows the device to be affixed to a perishable product after removing the release liner.

The top clear window can have one or more addition layers such as a UV absorbing layer and scratch resistant layer. The top clear window and bottom base substrate can be composed of high barrier materials to prevent or minimize diffusion of any component such as host solvent and activator solvent of the freeze indicating formulation.

The device can be machine readable such as by measuring color intensity and/or optical density. It can also be made machine readable by printing a barcode on a surface of the top clear window or the base substrate. If the base substrate is opaque white, a black or blue color barcode can be printed on the top surface of the base substrate. If the color of the indicator is blue before freezing, the barcode will not be readable and it will become readable when the indicator changes to red color upon freezing. Similarly, for a white latex-based indicator device, the barcode printed on the white base substrate will be obscured and not readable before freezing and it will become readable when the latex become transparent after the freezing and vice versa.

A particular advantage is realized when the indicator is partially polymerized diacetylene which undergoes the same color change upon freezing and upon heating above a certain pre-determined high temperature. The combination of a freeze indicator and a higher temperature, or thaw, indicator makes this device useful for shipping some products, such as shrimp and other sea foods, which spoil above a certain temperature yet lose some flavor if frozen.

The formulation resulting from the above methods will be composed of very fine particles of a nucleating agent in polymeric binder of a host medium, solvent/water.

The above are some examples of in-situ making of fine particles of a nucleating agent by mixing very viscous solutions of two reactants for making a freeze indicating device. The reactants can be mixed by many other methods of rapid mixing such as a screw injector where two viscous liquids get mixed in a screw extruder or creating a fine mist of the two solutions.

A freeze indicating formulation can be prepared by adding and mixing other ingredients such as indicator, preferably a latex/emulsion/dispersion or fine particles of a partially polymerized diacetylene, and an activator, such as a solvent such as ethylene glycol diacetate, which phase separates when water is frozen and has capability of destroying the latex and dissolves the diacetylene. Auxiliary components can be added to the freeze indicating formulation, such as a freezing point depressant, such as calcium chloride or ethylene glycol, a dispersant, such as a surfactant, a biocide to prevent any biological growth, a UV absorber and/or a heat stabilizer. The auxiliary components are preferably incorporated into polymeric component comprising the nucleating agent without limit thereto. This freeze indicating formulation will undergo a noticeable change such as a change in opacity or a color change upon freezing. The resultant freeze indicating device can be used to make freeze indicating devices as shown in FIG. 6.

Figure 6:
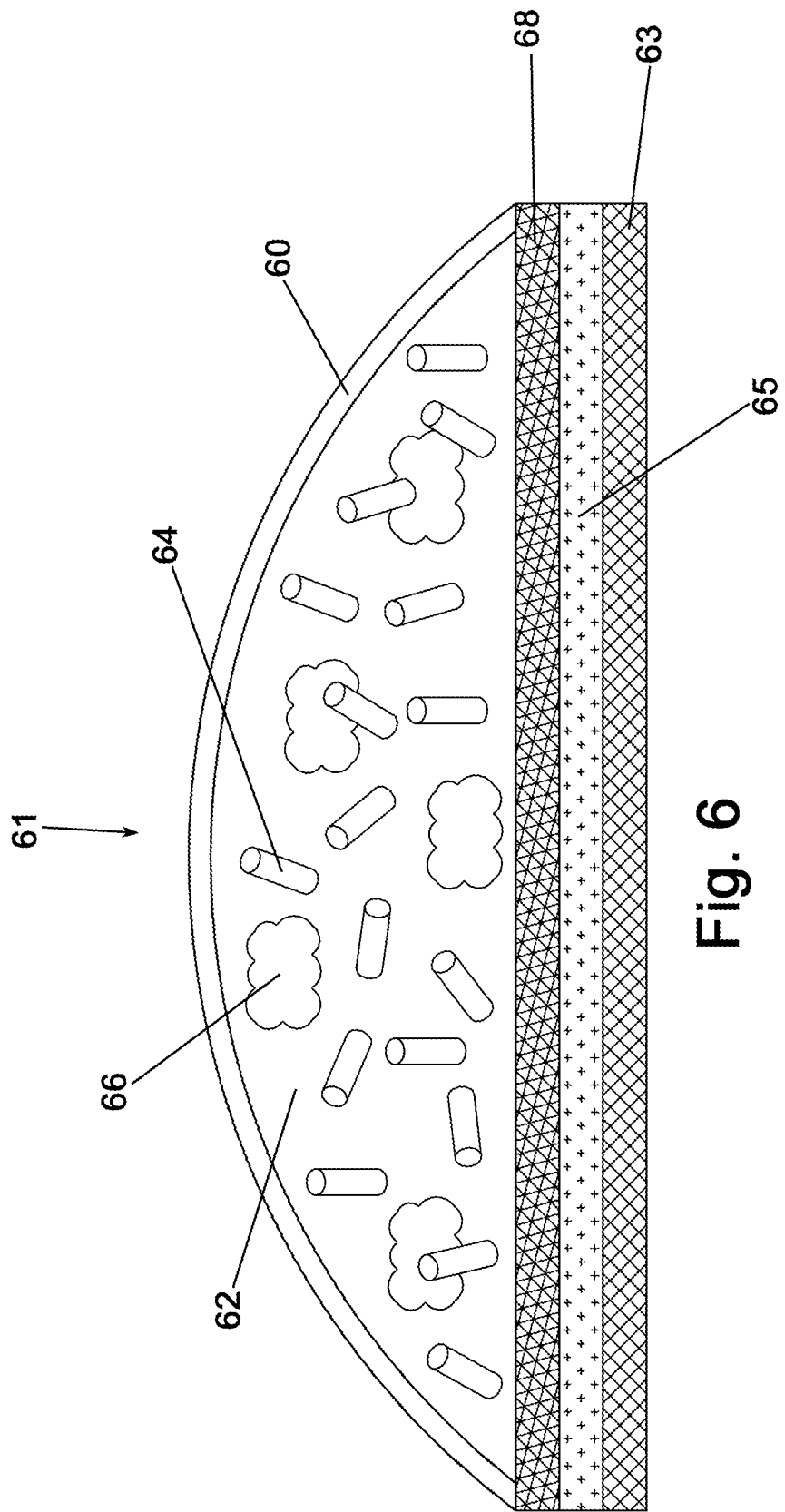
FIG. 6 is a cross sectional schematic presentation of a freeze indicating device of instant invention.

A freeze indicating device is illustrated in schematic cross-sectional view in FIG. 6. The device 61, comprises a transparent housing, 60, containing a very viscous or gel like medium, 62, which can be a gel or viscous solution of a, preferably water soluble, polymer in a host solvent with water, heavy water or a mixture thereof represented preferred host solvents. The medium dissolved in the host solvent can optionally have a freezing point depressant, such as calcium chloride or ethylene glycol, and an activator such as ethylene glycol diacetate wherein the activator is dissolved in the medium phase above an activation temperature. When the temperature drops to an activation temperature the host solvent is frozen, with the freezing aided by the nucleating agent composition, 66 in the medium, 62, and the activator phase separates from the medium forming a separated activator. Once separated from the medium the phase separated activator reacts with an indicator, 64, such as a partially polymerized diacetylene or a latex particle preferably present as suspended particles. Upon reaction with the phase separated activator, the indicator particles exhibit a physical or chemical transformation resulting in a noticeable and/or measurable change, such as blue-to-red or white/translucent-to-clear or vice versa.

The indicator, 64, preferably a particle, of the freeze indicator is capable of undergoing a noticeable or measurable change, such as a color change when contacted with the phase separated activator. Above the threshold temperature the activator is dissolved in the medium and therefore not in a sufficient concentration to cause the freeze indicator to change. As the freeze indicator is exposed to temperatures below the activation temperature, the activator phase separates from the host solvent, forming a separated activator thereby achieving a sufficient concentration to cause the indicator, 64, to undergo a noticeable change such as a color change.

The device, 61, preferably comprises a transparent housing, 60, within which the medium, 62, and other active components such as the indicator, 64, preferably as particles, and nucleating agent composition, 66, are contained. The transparent housing can be a clear plastic film forming a blister, cavity, or compartment, which is formed by sealing the transparent housing to a base substrate, 68. The base substrate, 68, can be made from the same material as clear window, 60, or can be composed of a different material. The base substrate, 68, and the transparent housing, 60, can be sealed together, such as heat sealed, to form a cavity or blister containing the indicator medium and other active components. The base substrate, 68, can be transparent or opaque, and is preferably white but can be other colors, and can have a message or barcode printed on its top surface if opaque or on its bottom substrate if it is clear. The base substrate, 68, can have a thin layer pressure sensitive adhesive (PSA), 65, and a release liner, 63. The PSA layer, 65, allows the device to be affixed to a perishable product after removing the release liner 63.

The transparent housing, 60, can have one or more addition layers such as a UV absorbing layer and scratch resistant layer. The transparent housing, 60, and bottom base substrate, 68, are preferably formed of high barrier materials to prevent or minimize diffusion of any component such as host solvent and activator of the freeze indicating formulation.

The shape of the freeze indicating device can be circular, square, rectangle or any other shape desired. The size of the freeze indicating device can be from 0.5 to 1,000 sq.cm., preferably from 1 to 25 sq.cm.

All ingredients are either dissolved or dispersed into the host medium.

A message or a color reference bar can be printed either on the device, on its substrate or on the side.

The device can be machine readable, such as by measuring color intensity and/or optical density. It can also be made machine readable by printing a barcode on a surface of the top clear window, 60, or the base substrate, 68. If the base substrate is opaque white, a black or blue color barcode can be printed on the top surface of the base substrate, 68. If the color of the indicator, 64, is blue before freezing, the barcode will not be readable and it will become readable when the indicator, 64, changes to red upon freezing. Similarly, for a white latex-based, emulsion-based or dispersion-based indicator device, the barcode printed on the white base substrate will be obscured and not readable before freezing and it will become readable when the latex become transparent after the freezing and vice versa.

The inherent property of the freeze indicating device of FIG. 6, especially when the indicator is partially polymerized diacetylene which undergoes the same color change upon freezing and also upon heating above a certain pre-determined high temperature. The combination of a freeze indicator and a higher temperature, or thaw, indicator, make this device useful for shipping some products, such as shrimp and other sea foods, which spoil above a certain temperature yet lose some flavor if frozen.

Figure 7:
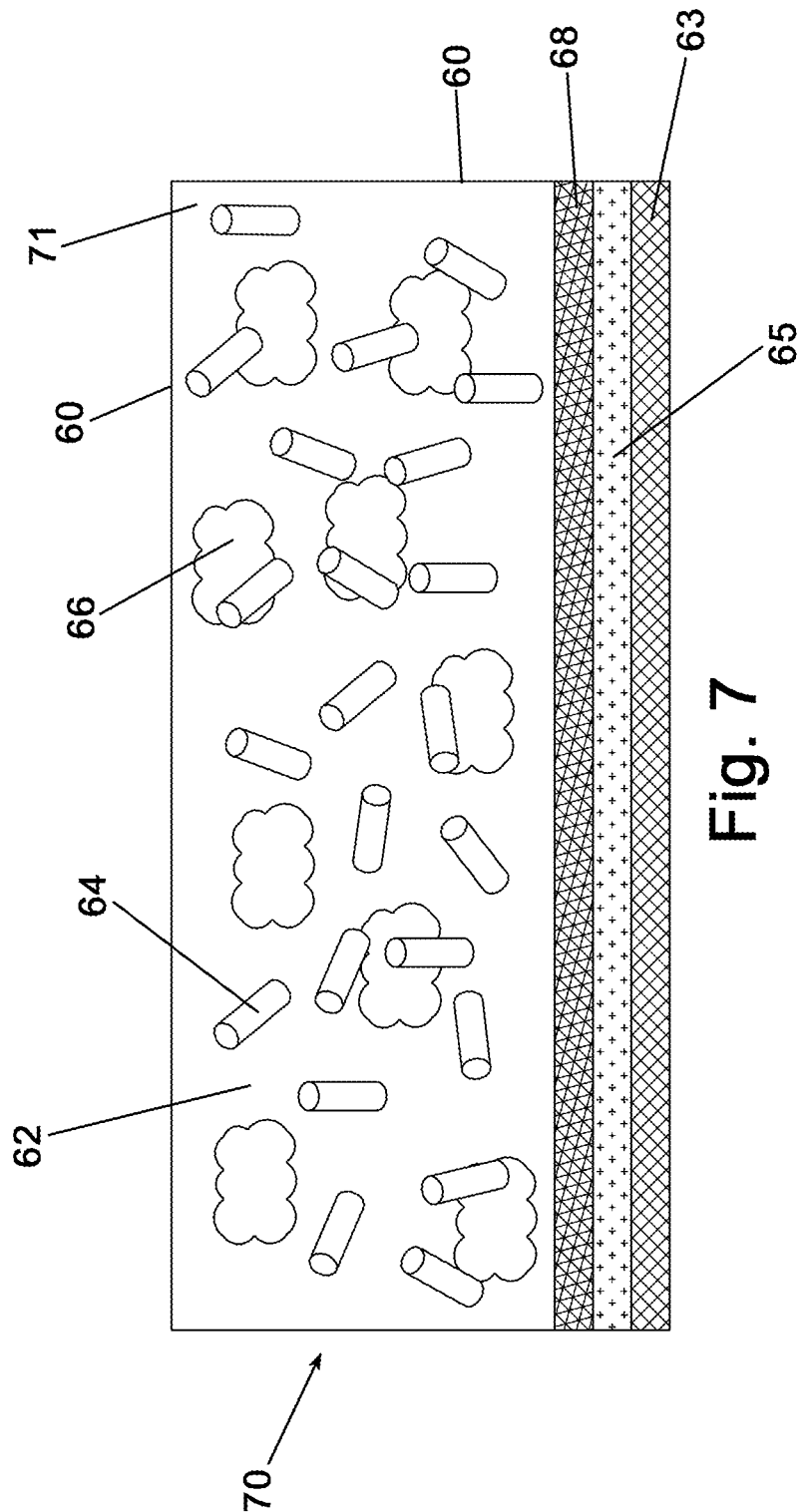
FIG. 7 is a cross sectional schematic presentation of another freeze indicating device of instant invention.

The blister device of FIG. 6 can be made flat as represented by the flattened device, 70, and kept flat by inserting an absorbent white, opaque substrate, 71, such a paper in the device as shown in FIG. 7. Flat devices are more preferred as they will undergo a uniform color change.

Figure 8:
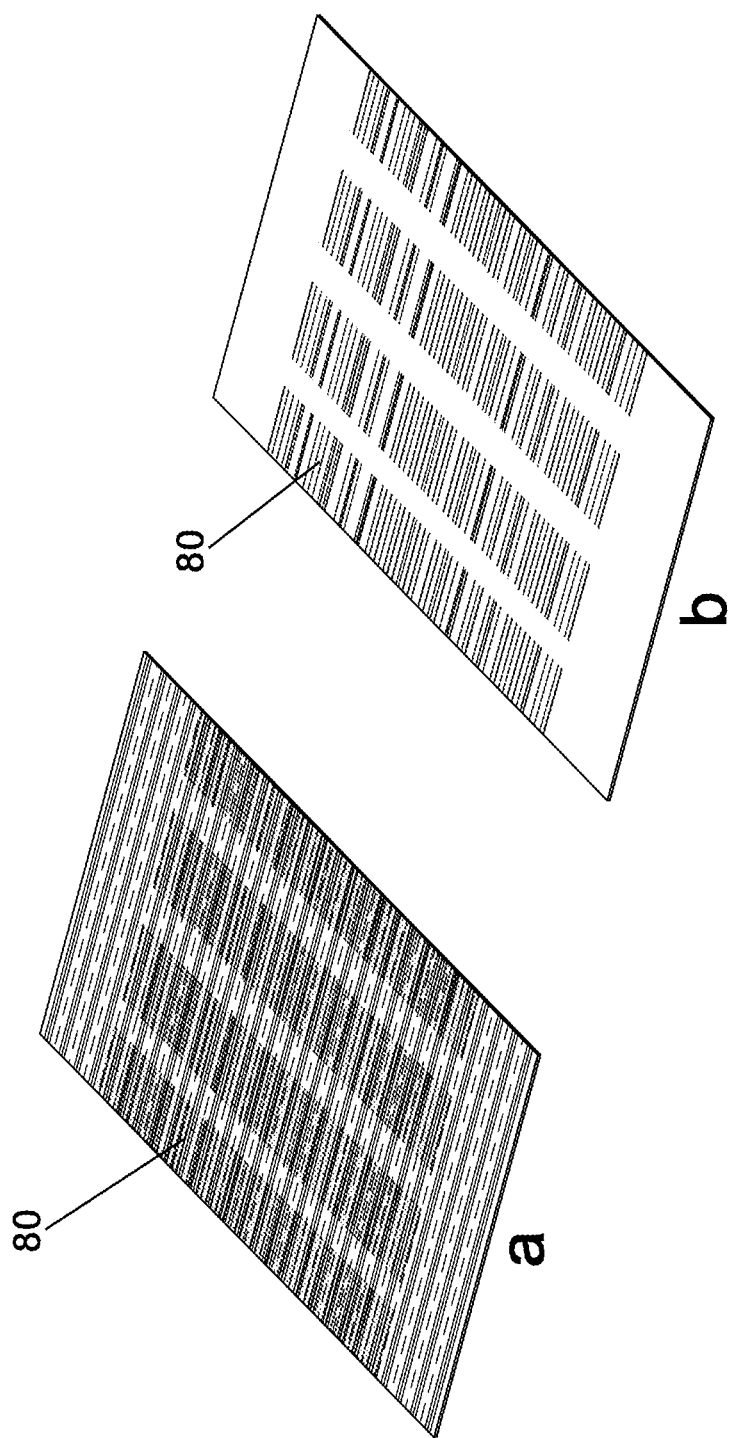
FIG. 8 shows a schematic representation of a machine-readable freeze indicating device similar to Example 11 before (a), and after (b) freezing.

FIG. 8 is a schematic representation of a machine-readable freeze indicating device of Example 11 before (a) and after (b) freezing. The barcode, 80, is illustrated as being on the outside surface of base substrate without limit thereto. The freeze indicating device was blue and the black barcode was not readable with a barcode reader before freezing the device. Upon freezing, the device became red and the barcode was readable with a barcode reader. The barcode can be blue, purple and violet and still be readable.

In-situ method of making nucleating agents:

Many methods of mixing two reactants to form fine particles, nano to micron sized, of a different composition in a water or water-soluble polymers can be used to make nucleating agents, such as silver halides, in-situ. One method is to dissolve a reactant, such as silver nitrate, in a highly viscous aqueous solution of a polymer and the counter reactant, such as potassium iodide in an aqueous solution of the same polymer. One can make fine crystals of the product, silver iodide, by mixing the two solutions at a very high speed. As the viscosity of solution is high, the crystals of the product, silver iodide, will not grow big. One can obtain nano to micron sized crystal of silver iodide by using a high viscosity binder and mixing them at a very high speed.

Freeze Indicating Device:

The freeze indicating device can comprise, for example, a transparent housing, a temperature sensitive formulation which includes a mixture of water or heavy water, a water soluble polymer in the form of a very viscous solution or gel, an indicator, such as particles of a latex or a partially polymerized diacetylene which undergo a noticeable change upon freezing, a nucleating agent, an activator, such as a solvent which initiates a noticeable change in the indicator when the device is frozen. For a latex-based, emulsion-based or dispersion-based indicator device, an activator may not be required. Optionally the device may comprise a dispersant to keep solid particles suspended, a fungicide to prevent any fungal growth and a freezing point suppressant; such as a salt, such as calcium chloride or ethylene glycol; to lower the freezing point of the device. The freeze indicating device will be milky opaque white or translucent if a latex is used as an indicator and colored, such as blue, but almost transparent if a partially polymerized diacetylene is used as an indicator. The device will undergo a noticeable change, such as milky opaque white to clear or vice bersa or a color change, e.g., blue to red color change when the formulation freezes.

Nucleating Agents:

The materials for in-situ nucleation can be organic, inorganic, organo-metallic and biological. The most preferred are inorganic materials because of their higher stability. The inorganic nucleating agents can be oxide, hydroxide, sulfide, halides, phosphate, and sulfate of metals, preferably that of aluminum, barium, boron, calcium, copper, gold, iron, magnesium, manganese, nickel, silver, tin and zinc. These salts and minerals can be prepared by reacting their cations with anions. The most preferred nucleating agent is silver iodide which can be prepared, for example, by the reaction of silver nitrate with potassium iodide. If these materials, such as silver iodide, have an ability to get adsorbed they can be made more effective by adsorbing them on materials like colloidal cellulose, silica gels or activated carbon.

Co-Crystallized and Doped Silver Halides:

Though silver iodide is a very effective nucleating agent, silver iodide doped or co-crystallized with chloride and bromide, to form AgICl and AgIBr, are even more effective than silver iodide alone. The ratio of silver iodide to silver chloride can be from 99:1, preferred ratio is about 9:1.

Minimizing Radiation Sensitivity:

Silver halides are light sensitive. Fine particles of silver halide slowly turn gray under ambient light and the transition is faster in sunlight. Such color development is not desired for temperature indicators such as freeze indicators which undergo a color change. The sensitivity of silver halides including co-crystallized silver halides to light can be almost eliminated by co-crystallization, doping or by adding halides of other metals. Though any salt such halide, sulfate, hydroxide, sulfide, bromide, oxalate, phosphate, acetate and sulfate of any metal from the periodic table can be used, it is preferred to use that of divalent or higher valent halides such as salts of aluminum, barium, calcium, copper, magnesium, nickel, tin or zinc. The concentration of these divalent and higher valent metals required is usually low, less than 10 wt %, preferably less than 2%.

The doped and co-crystallized nucleating agents can be prepared by reacting silver nitrate dissolved in a highly viscous polymer solution with a solution of a metal halide or more than one metal halide preferably in the same polymer solution at high speed. Representative halides that can be used for preparation of silver halides by reacting with silver nitrate are selected from the group consisting of aluminum chloride, ammonium bromide, ammonium iodide, barium chloride, barium iodide, barium bromide, calcium bromide, calcium chloride, iron (II) chloride, iron (II) bromide, iron (III) bromide, cobalt chloride, cobalt bromide, copper chloride, copper bromide, nickel chloride, nickel iodide, lithium chloride, lithium bromide, lithium iodide, magnesium chloride, potassium bromide, potassium chloride, potassium iodide, sodium bromide, sodium chloride, sodium iodide, tin (II) bromide, tin (ii) iodide, tetrabutyl ammonium chloride, tetraethyl ammonium iodide, zinc chloride, zinc iodide and zinc bromide.

Stabilization

To prevent settlement and coagulation of fine crystals of nucleating agents, such as silver halide, either the medium should be equally dense or of very high viscosity polymer solution or gel. It can also be achieved by adding a particle suspending agent. The viscosity of the polymer solution in this embodiment is preferably at least about 1,000 cP and more preferably at least about 10,000 cP or higher. The medium should be solid soft gel, such as that of gelatin and agar or by addition of suspending agents normally used for suspending fine particles of pigments in paints and inks. High molecular weight, such as above about 500,000 Daltons, water soluble polymers are readily available. Some of them are cross linked or form a gel by processes, such as hydrogen bonding and interpenetrating network. When the particles of nucleating agents are fine, they remain suspended in highly viscus solution of water-soluble polymers without any suspending agent. Depending upon the molecular weight, the concentration of the polymer can be varied from 1 wt % to 70 wt %, preferably 5-20 wt %.

Concentration of Nucleating Agents:

The concentration of fine particles of a nucleating agent, such as silver iodide, dispersed in water soluble polymer required for effective freezing of light water and heavy water is typically less than 5 wt %, often about 0.1 wt % is effective. We have also observed that higher concentrations of silver iodide make the freezing faster and at a couple of degrees centigrade higher temperature. The preferred range of concentration of fine particles of nucleating agents, such as silver halides in a polymeric solution, is between 0.05 to about 5 wt %, and more preferably 0.1 to 2 wt %. Fine particles of silver halide are very effective compared to proteineous microorganisms which typically require more than 10 wt %. Even at 10 wt % concentration of microorganisms, it takes tens of minutes for freezing and displaying the change in properties of the freeze indicator. The average particle size of nucleating agents, such as silver halides particularly silver iodide or doped silver halide, can vary from 10 nm to 100 microns. The preferred range is 0.01 to 1 micron.

Non-Aqueous System:

Fine crystals of silver halides, such as AgI, AgIBr and AgICl, can also be generated in-situ in an organic/solvent system. For example, by reacting a polymeric viscous solution of an organosilver compound, such as silver acetate, disilver cyanamide, silver thiocyanate, disilver diazomethanide, silver amide, silver cyanate, silver cyanodinitromethanide, silver cyclopropylacetylide, silver isophthalate, silver malonate or sliver oxalate with a very viscous polymeric solution of solvent soluble halide salts such as tetrabutyl ammonium iodide, tetrabutyl ammonium bromide and tetrabutyl ammonium chloride.

Dispersant or Suspending Agents:

The fine particles of nucleating agents need to remain suspended in the liquid or semisolid indicating formulations. The nucleating agents can be kept suspended in the indicating formulation by using suspending agents, also known as dispersants. The simplest dispersants are surfactants. Surfactants form a steric barrier thereby keeping fine solid particles suspended in a liquid medium. To make a stable dispersion of nucleating agents, it is preferred to use an emulsifying agent or a dispersant. A large number of surfactants are available commercially that can be used including: polyoxyethylene alkyl phenols, polyoxyethylene esters, polyoxypropylene esters, salts of fatty long chain acids and sulfonates, polyethylene oxides, and polypropylene oxides, 2-octylphenol, ammonium laurate, castor oil, polyhydroxystearic acid, polyricinoleic acid, sodium polyaspartate, sodium polyacrylate, butyl polyvinyl pyrrolidone and sodium polynaphthalene sulfonate.

Application to Freeze Indicators Reported in the Prior Art:

In-situ generated fine particles of silver halide can be used for almost any temperature indicating devices including freeze indicators reported in the literature. Most of them use milled minerals, silver iodide or microorganisms as nucleating agents. Milled silver iodide and microorganisms can be replaced with in-situ generated fine particles of silver halide to make the freeze indicating devices very effective and fast.

In-situ generated fine particles of silver halide can be used for freeze indicators comprising microcapsules, emulsions, colloids, dispersions and polymeric latexes, rupturing of ampules and change in volume and those based on phase change, phase reversal, phase separation, phase separation and dissolution of indicators, coagulation, becoming opaque or translucent to clear or vice versa, pH change or color change.

Freezing Inert Liquids:

The addition of a neutral liquid, such as low molecular weight paraffins, which freeze at zero or any other desired temperature also act as a weak nucleating agent for those materials which crystallize during cooling near 0° C., for example boric acid. It is hypothesized that as an aqueous solution of boric acid is cooled, the solubility of boric acid decreases and crystallizes thereby providing fresh nucleation sites. This is an example of making of a fresh nucleating agent when or just prior to the freeze indicator is cooled to the freezing temperature.

Water Soluble Polymers:

A variety of polymers can be used as a binder for the freeze indicating system. The use of polymer/binder will depend on the nature of the indicating formulation and its components. For an aqueous indicating system, water soluble polymers are required. Polymers, such as polyvinyl alcohol, hydroxyethyl cellulose, carboxymethyl cellulose, starch, agar, guar gum, gelatin, polyethylene glycol, polyethylene oxide and other synthetic and natural water-soluble polymers can be used as binders for the devices.

Any polymeric material which forms a three-dimensional network can be used. Both gel forming and non-gel forming materials, such as polymers, can be used as binders. Higher molecular weight binders are preferred. Materials which form a gel at room temperature are the most preferred binders. Polymers which are crosslinked or can be crosslinked can also be used. They include natural and synthetic polymers, such as gelatin, agar, agarose and super absorbents, such as 60 mole % graft copolymer of starch, polyacrylamide, polyethylene oxide, polyacrylic acid sodium salt. One can use a variety of polymers, copolymers and their mixtures as binders to get desired properties, such as high viscosity or gel strength.

Water soluble polymers and gums, such as alginates, hydroxy alkyl cellulose such as carboxy methyl cellulose, carrageenan, guar gum, gum agar, gum ghatti, gum karaya, gum tragacanth, locust bean gum, pectin, polyacrylamide, polyacrylic acid, polyvinyl alcohol, polyethylene oxide, polyethylene glycols, polyvinylpyrrolidone, starch and its modified forms, tamarind gum, xanthan gum, gelatins, and polyethyleneimine, their copolymers including graft copolymers and their mixtures, can be used as binders. Such polymers are listed in "Polymer Handbook" by A. Halter, Third Edison (J. Brandrup and E. H. Immergut Eds), John Wiley and Sons, New York, N.Y. 1989.

Reversible gel forming polymers listed in the following books and reviews can also be used (1) "Reversible Polymeric Gels and Related Systems", Paul S. Russo, ACS Symposium Series #350, Washington, D.C., 1987; (2) L. L. Hench and J. K. West, Chem. Rev., 90, 33 (1990); (3) "Hydrogels" reported by Nagasaki and K. Kataoka, in Chemtech, p23 Mar. 1997; E&E News, Jun. 9, 1997 p26, Encyclopedia of Polymer Science Technology, 7, 783 (1986); and (4) "Reversible Crosslinking", Encyclopedia of Polymer Science Technology, 4, 395, (1986), L. Z. Rogogovina and G. L. Slonimiski, and Russian Chemical Review, 43, 503 (1974).

Inorganic gelling materials can also be used as binders. A wide variety of sol-gel type materials are reported in the literature.

The viscosity of polymer solution for in-situ generation of nucleating particles, such as silver halides can range from 500 cP to 50,000 cP, the referred range is 5,000 cP to 20,000 cP. One can also use soft solid gels, such as that of gelatin and agar.

The most preferred medium for freeze indicator is solution of a polymers in light water, heavy water and their mixtures. Further preferred is a solution of water-soluble polymers which form very viscous solutions at lower concentration or form solid soft gel.

Latexes as Binders:

Polymeric latexes can be used as the binder. When latexes, dispersions or emulsions are used, the nucleating agents of the invention would change from translucent white to clear upon freezing. The latex material can be acrylic, natural, nitrile, polychloroprene, paraffin, polyethylene, waxes, such as carnauba, styrene-butadiene, or vinyl pyridine based or mixtures thereof. Other latexes suitable for demonstration of the invention include styrene polymers, styrene/butadiene copolymers, styrene/acrylic acid copolymers, vinyltoluene/t-butyl styrene copolymers, vinylidene chloride/vinyl chloride copolymers or mixtures thereof. The latex material preferably has a particle size of about 0.05 microns and is present in an amount of at least 5 wt % up to about 30 wt %, preferably up to about 15 weight percent.

Temperature:

The temperature range of an indicating system can vary from 200° C. to negative 100° C. A preferred temperature range for the freeze indicator is from 60° C. to −40° C. and most preferable the range is from 2° C. to −20° C.

Lowering of Freezing Point:

Lowering of the freezing point can be done by adding water soluble organic or inorganic materials which depress the freezing point of water. The most preferred materials for lowering freezing points are sodium, potassium and calcium halides such as sodium chloride and calcium chloride.

Two or More Nucleating Agents:

The system can be more efficient by using two types of microcrystals, cellulose and that of silver halide as shown in Example 1.

Increasing Freezing Point:

The freezing point can be increased from about minus 5° C. to plus 4° C. by using $D_2O$ and in between temperatures by using a mixture of $D_2O$ and $H_2O$.

Fine Crystals of Nucleating Agent:

Fine crystals of silver halides can be obtained by mixing very viscous, gelled or frozen solution of two reactants such as silver nitrate in one and potassium iodide in the other as shown in Examples 9.

Barrier Film:

Many devices; especially indicating devices, such as freeze, thaw, time, temperature, humidity, radiation, time-temperature and sterilization indicators often use volatile materials. Many of these devices are also sensitive to oxygen and humidity. These volatile materials can diffuse out of the protective plastic housing/films or ambient materials such as water/humidity and oxygen can diffuse in the system. To see the color changes, at least one side of the indicating devices should be transparent and to protect the devices from volatile materials diffusing out, thereby drying out of the indicating devices, and outside materials such as humidity/water and oxygen diffusing in and diluting the composition, a high barrier, ultra or super high barrier films or housing materials is required. Even though the indicator industry faces the problem of diffusion of materials in and out of the indicators, ultra-high barrier films are not used. Thus, many of the indicating devices require a substantially transparent or translucent and very or ultra-high barrier film.

Ultra-high barrier films in which a thin layer of a metal oxide such as aluminum oxide, magnesium oxide, silicon oxide, silicone oxinitride or indium tin oxide (ITO) is formed on a substrate, usually a dimensionally stable plastic films such as polyester and polypropylene, are used in packaging of products which require a barrier for various types of gases such as water vapor, aromas and oxygen as well as in packaging to prevent changes in the quality of foods, industrial products, medicinal products and alike. The film for the indicator can be heat or adhesive laminated or coextruded with other barrier polymers. The ultra-high barrier film may be multilayer, such as more than one layer of aluminum oxide, magnesium oxide, silicon oxide, silicone oxinitride or indium tin oxide (ITO) and barrier plastic layers. Aside from the use for packaging, gas barrier films are also used as substrates for liquid crystal displays, solar cells, organic electroluminescence and alike.

The barrier properties of these high barrier films can be further increased by coating the film with an ionomeric polymers to minimize diffusion of organic solvents, nano barrier coating, plate-minerals coating, highly crosslinked polymers and alike. High barrier nano coating is now commercially available such as Nano-Shield from W. R. MEADOWS, Inc. which is a completely inorganic coating used to minimize penetration of organic solvents and emulsified hydrocarbons. Another example is Ultra-Ever Dry which is a superhydrophobic and oleophobic coating that repels almost any liquid. Ultra-Ever Dry uses proprietary nanotechnology to coat an object and create a barrier of air on its surface. This barrier repels water, oil and other liquids unlike other coatings. The film can be coated with a water and solvent repellent layer, highly crosslinked barrier polymers such as polyacrylates, polyepoxide and polyurethane to minimize the diffusion. These layers may have a primer layer for binding them together.

Barrier films made from polyvinylidene chloride (PVDC), polychlorotrifluoroethylene or ethylene vinyl alcohol copolymer (EVOH) which can be biaxially oriented and with or without a coating thereon can also be used to make the indicating devices. Plastic gasoline tanks are sulfonated inside to prevent diffusion of gasoline. A layer of polymers like Nefion, a sulfonated fluorocarbon polymer, can provide barrier property for organic solvents.

The barrier films disclosed in U.S. Pat. Nos. 6,287,652; 6,677,013; 7,288,311; 7,815,983; 7,854,994; 7,984,807; 8,057,904; 8,343,623; US Patent Application Nos. 20010009175; 20060234571; 20070224368; 20080050567; 20080085418; 20100003482; 20100009147; 20110171461; 20120064318; 20120196141; 20120208033; 20120321846; and European Patents or Patent Applications Nos. EP0269350A2; EP0395412A3; EP0546709B1; EP0688812A1; EP1273523A1; EP1736308A1, EP1792726A1; EP2000298A1; EP2052855A2; EP2123446A1; EP2549560A1 are exemplary.

Diacetylenes:

Many partially polymerized diacetylenes undergo an irreversible color change when contacted with certain solvents. Certain compounds/solvents undergo phase separation or a "salting out effect" from their solution/mixtures when the temperature is lowered to a predetermined temperature, such as 0 to −30° C., and preferably 0 to −10° C. For example, when the temperature of a solution of about 20 weight percent or below of ethylene glycol diacetate (ED) in water, is lowered below 0° C., water freezes and ED the separates thereby forming a separate liquid phase. If such a mixture is in contact with a partially polymerized diacetylene (PPD), such as partially polymerized 4BCMU (pp4BCMU), the unpolymerized monomer molecules become dissolved by ED forming a monomer enriched liquid ED phase. The PPD phase/crystal is depleted of monomer thereby causing a color change such as from blue-to-red. The chemical formula of 4BCMU is R—C≡C—C≡C—R, where R= $[(CH_2)_4OCONHCH_2COO(CH_2)_4H]$, 5,12-dodecadiyn-1, 12-bis(butoxycarbonylmethylurethane).

Advantages offered by the present invention include the ability to modify the temperature at which the device will change color by the suitable additions of soluble salts to the solvent phase. For example, sodium chloride, calcium chloride and organic salts, such as ammonium citrate, can depress the freezing point down to −10° C. Similarly, the addition of ethylene glycol and other water soluble organic compounds can depress the freezing temperature of water down to −30° C. By the proper use and selection of the salt or water-soluble organic compounds such as glycerol, and weight percentage of the solution, the predetermined freezing temperature can be altered.

A number of patents have been issued on the use of diacetylenes for applications, such as time temperature indicators for monitoring thermal degradation of perishables, thermochromic materials, recording media, and in radiation dosimeters. Some representative patents on imaging applications using diacetylenes are: U.S. Pat. Nos. 4,412,898; 4,668,598; 4,684,688; 4,705,741; 4,954,428; 4,954,543; 5,139,928; 5,359,200; and 5,420,000. Some representative patents on the use of diacetylenes in time-temperature indicators are: U.S. Pat. Nos. 3,501,302; 3,679,738; 3,723,121; 3,743,505; 3,772,011; 3,772,028; 3,811,895; 3,999,946; 4,066,676; 4,384,980; 4,734,355; 4,784,934, and 4,954,543; which are all incorporated by references.

Freeze indicators which use diacetylene or partially polymerized diacetylenes are disclosed by Patel in U.S. Pat. Nos. 6,472,214 and 9,581,504.

A large number of partially polymerized diacetylenes which undergo an irreversible color change when contacted with an activator can be used for making the device. Some typical examples of color change of PPDs with solvents are described in a publication by Patel, J. Macromol. Sci. Phys, B20, 111 (1981). PPDs having the side chain $(CH_2)_4OCONHR1$ usually change from blue-to-red when contacted with a solvent such as acetone. Certain PPDs, such as that of "166", R—C≡C—C≡C—R, where R=$CH_2OCONH(CH_2)_6H$ change from red-to-blue as taught in U.S. Pat. No. 5,420,000 when contacted with a solvent. Preferred partially polymerized diacetylenes are those which have high solubility in common, nontoxic, high boiling solvents at low temperatures. Esters of diacetylene are a preferred class of indicators as they usually have high solubility in common solvents. Other diacetylenes having functionality such as alkyl, acid, alcohol, urethanes and amides can also be used. The speed of the color change will depend upon parameters such as solubility, particle size of diacetylene crystals, solvent/activator strength, temperature, nature of co-solvent/additive, binder, and nature of the diacetylene.

The partially polymerized diacetylene compositions applicable herein are those having the general formula, R'—C≡C—C≡C—R", where R' and R" are the same or different substituent groups. The class of diacetylenes, where R' and R" are the same, is preferred.

Other diacetylenes having the following general formulas can also be used in the freeze indicating devices: R'—(C≡C)$_n$—R", where n is at least 3 and most preferably n=3-5; split di and higher acetylenes: such as R'—(C≡C)$_m$—Z—(C≡C)$_o$—R", where R' and R" can be same or different groups, where Z is any diradical, such as —$(CH_2)_x$—, wherein x is 2-10, and —$C_6H_4$—, wherein m and o are separately an integer of 2 or higher; and polymeric di and higher acetylenes such as [-A-(C≡C)$_p$—B]$_q$, where p is at least 3 and preferable p=3-5; where A and B can be the same or different diradical where A and B are independent selected from H$(CH_2)_n$, OCONH—$(CH_2)_n$H, and OCO $(CH_2)_n$H.

Further preferred diacetylenes include those where R' and R" are the same and are selected from: $(CH_2)_b$—H; $(CH_2)_b$—OH; $(CH_2)_b$—OCONH—R1; $(CH_2)_b$—OCONH—$(CH_2)$—CO—O—R1; $(CH_2)_b$—O—CO—R1; $(CH_2)_b$—COOH; $(CH_2)_b$—COOM; $(CH_2)_b$—NH$_2$; $(CH_2)_b$—CONHR1; $(CH_2)_b$—CO—O—R1; where b=1-10, preferably 1-4, and R1 is an aliphatic or aromatic radical, and M is a cation, such as Na$^+$ or (R1)$_3$N$^+$.

The preferred diacetylenes are the derivatives of 2,4-hexadiyne, 2,4-hexadiyn-1,6-diol, 3,5-octadiyn-1,8-diol, 4,6-decadiyn-1,10-diol, 5,7-dodecadiyn-1,12-diol and diacetylenic fatty acids, such as tricosa-10,12-diynoic acid (TC), pentacosa-10,12-diynoic acid (PC), and cocrystallized mixtures thereof. The most preferred derivatives of the diacetylenes, e.g., 5,7-dodecadiyn-1,12-diol, are the urethane and ester derivatives. Preferred derivatives of 5,7-dodecadiyn-1,12-diol include: urethane (—OCONH—) derivatives, R'$(CH_2)_4$—C≡C—C≡C—$(CH_2)_4$—R', including: hexyl urethane: R'=OCONH$(CH_2)_5CH_3$, pentyl urethane: R'=OCONH$(CH_2)_4CH_3$, butyl urethane: R'=OCONH$(CH_2)_3CH_3$, ethyl urethane: R'=OCONHCH$_2$CH$_3$, and methyl urethane: R'=OCONHCH$_3$; and ester (—OCO—) derivatives, R'"$(CH_2)_4$—C≡C—C≡C—$(CH_2)_4$—R'", including: butyl ester: R'"=OCO$(CH_2)_3CH_3$, ethyl ester: R'"=OCOCH$_2$CH$_3$, and methyl ester: R'"=OCOCH$_3$.

The preferred urethane derivatives can be prepared by reacting 5,7-dodecadiyn-1,12-diol with appropriate isocyanates, such as butylisocyanatoacetate, in a solvent, such as tetrahydrofuran, using catalysts, such as di-t-butyltin bis(2-ethylhexanoate) and triethylamine. Preferred ester derivatives can be prepared by reacting 5,7-dodecadiyn-1,12-diol with appropriate acid chlorides in a solvent, such as dichloromethane, using a base, such as pyridine as the catalyst.

Several urethane derivatives of (1) 2,4-hexadiyn-1,6-diol, (2) 3,5-octadiyn-1,8-diol, [HO$(CH_2)_2$—C≡C—C≡C—$(CH_2)_2$OH], (3) 4,6-decadiyn-1,10-diol, [HO$(CH_2)_3$—C≡C—C≡C—$(CH_2)_3$OH], and (4) 5,12-dodecadiyn-1,12-diol, [HO$(CH_2)_4$—C≡C—C≡C—$(CH_2)_4$OH], were also prepared and cocrystallized to increase the reactivity of the other diacetylenes.

A preferred conjugated diacetylene is selected from the group consisting of: H$(CH_2)_4$OC(O)CH$_2$NHC(O)O$(CH_2)_4$—C≡C—C≡C$(CH_2)_4$OC(O)NHCH$_2$C(O)O$(CH_2)_4$H and H$(CH_2)_6$NHC(O)OCH2-C≡C—C≡C—CH$_2$OC(O)NH$(CH_2)_6$H.

Though individual diacetylenes can be used, the reactivity of diacetylenes can also be altered by cocrystallization. Cocrystallization can be achieved by dissolving two or more diacetylenes, preferably conjugated, prior to crystallization as described in U.S. Pat. No. 4,189,399.

Diacetylenes develop noticeable color at about 0.1% polymer conversion. Partially polymerized diacetylenes are those having a degree of polymer conversion from 0.1 to 99.9 mol %. Though partially polymerized diacetylenes having higher polymer conversion can be used, the preferred range for the freeze indicators is 0.5 to 10% conversion. A greater degree of conversion results in a darker blue color and thus a greater dramatic color change and is preferred since a lesser quantity of partially polymerized diacetylene is required to obtain visually observable color change.

Though activation, or polymerization of diacetylene, with ultra violet light radiation at a wavelength of 254 nm and 60 KeV X-ray are preferable for activation of the device, the devices can also be activated with other high energy radiation such as gamma ray and 10 MeV electrons.

Though we demonstrated the concept with PPDs, one can use any material, such as solvatochromic dyes [see Chem. Soc. Reviews 1992, page 1417, Chem Rev. 94, 2319 (1994) and J. Chem Ed. 62, page 460 (1965)] and solvent soluble dyes instead of a PPD. Any other material which can be made to undergo a color change by contacting a phase separated solvent can be used as an activator. An example of a solvatochromic dye is diphenylthiocarbazone in 4 weight percent ethylene glycol diacetate in water which changes from colorless to red when freezing occurs at about 0° C.

An element of the invention is that the nucleating agent composition, comprising the nucleating agent in a polymeric matrix, does not comprise an imaging dye. An imaging dye is a dye which is coupled with exposed silver halide during photographic development to form a color image.

Activators:

A large number of solid and liquid compounds can be used as activators for introducing the color change in indicators such as PPDs. However, a preferred class of activators are solvents which are miscible with water but undergo a phase separation when the temperature reaches the freezing point of water. The preferred activators for PPDs are solvents which dissolve diacetylene monomer at about the freezing point of water. Thus, a preferred solvent will be one which is water soluble and phase separates in the temperature range of 0 to −30° C., and preferably at 0 to −10° C., and dissolves diacetylene monomer at these temperatures. A particularly preferred solvent is ethylene glycol diacetate (ED).

Selection of an Activator:

The color change of the freeze indicator is based on dissolution of unreacted monomer of a partially polymerized diacetylene. Solubility of each diacetylene is different. Diacetylenes such as 4BCMU are readily soluble in most common organic solvents. While other diacetylenes, such as 1BzU (R=$CH_2$—OCONH-benzyl) is soluble in only very strong polar solvents such as dioxolane at high temperature. Hence, a solvent suitable as an activator for one diacetylene may not be suitable for the other diacetylenes.

Generally, the activator is present in about 0.05 to 50 weight percent of solution and preferably, from 2-6 weight percent of solution. Solvents having limited, such as less than 20 wt % by weight, solubility in water are further preferred because they tend to more readily separate out of the aqueous solution at about 0 to −10° C. Also desired characteristics are that the solvent should have a high boiling point and exhibit no diffusion/permeation through the container/film thereby avoiding issues related to contact with solvent or with solvent exiting the containment provided by the device.

Activators useful in the invention device including the following: $C_1$-$C_{15}$ aliphatic, acyclic, aromatic and substituted aliphatic and aromatic amides preferably acetamide, dimethylformamide and chloroacetamide; alcohols, preferably amyl alcohol, hexyl alcohol, and dichloropropanol; esters, preferably methylpropionate, amylformate, diethyl maleate, ethylene glycol diacetate, ethylsalicylate, and triacetin; nitroalkanes preferably nitropropane; aldehydes, preferably butyraldehyde; carbonates, preferably diethylcarbonate and propylene carbonate; aromatic alcohols/phenols, preferably dihydroxy benzene, benzyl alcohol and phenol; amines, preferably diethanolamine, dimethylpyridine and cyclohexane diamine; ether-esters preferably ethoxyethylacetate, trioxane, tetraethylene glycol dimethylether, benzyl ether, phenylether, propylene glycol ethylether acetate and propylene glycol butylether; alcohol-esters, preferably ethylene glycol monoacetate; acids, preferably glutaric acid, isobutyric acid, mandelic acid, and toluene sulfonic acid; ketones, preferably methylethylketone, hydroxyacetophenone, acyclic ketones; ketone-esters, preferably methylacetoacetate; lactones, preferably propiolactone and butyrolactone and methyl pyrrolidone.

Preferred solvents are which have solubility in water less than 20 wt %. They include 1-butanol, 1-hexanol, 1-pentanol, 2-butoxyethanol, 2-cyclohexen-1-one, 2-methyl-1-proponal, 2-methylcyclohexanone, 2-phenoxyethanol, 3'-methoxyacetophenone, 4-hydroxy-2-butanone, 4-methylcyclohexanone, 4-phenyl-2-butanone, 5-hydroxy-2-pentanone, benzyl ether, butyl acetate, butyl nitrite, cinnamyl alcohol, cycloheptanone, cyclohexanone, cyclopentanone, dibutyl adipate, diethyl I-tartrate, diethyl malate, diethyl maleate, diethyl malonate, diethyl oxalate, diethyl phthlate, diethyl succinate, dimethyl carbonate, dimethyl maleate, dimethyl malonate, ethyl 2-oxocycicohexanacarboxylate, ethyl 2-oxocyclopentanecarboxylate, ethyl propionate, ethylene glycol diacetate, isobutyronitrile, methyl cyclopentanone-2-carboxylate, mineral oil, n-butyl I-lactate, n-butyronitrile, and propionitrile A mixture of solvents can also be used as the activator as for example, ethylene glycol diacetate, ED, and ethylene glycol. High boiling esters, such as ED and ethylene glycol dipropionate, and the like, are preferred activators. One can use more than one activator in varying proportions. One may use additives such as cosolvents; especially highly polar organic solvents such as alcohols, acids and amines, and ethers; surfactants and nucleating agents. One example of a mixture of activators and surfactant is ethylene glycol diacetate, ED, ethylene glycol and 2-octylphenol.

Since the PPDs do not change color if the mixture of water and activator does not freeze, it is desirable to ensure freezing, indicated by ice formation from water, of the cosolvent/mixture by the use of a nucleating agent. A wide variety of nucleating agents are reported in the literature. They include some solid organic and inorganic materials, such as calcium carbonate, sulfides of copper, tungsten, beryllium and iron, beryllium aluminum silicate, silver iodide. A porous material such as paper and cotton can also be used as nucleating agents.

Emulsifying Agents:

To make a fine dispersion of indicator in the activator system, it is preferred to use an emulsifying agent such as a wetter/surfactant. A large number of surfactants are available commercially including: polyoxyethylene alkyl phenols, polyoxyethylene esters, polyoxypropylene esters, salts of fatty chain acids and sulfonates, polyethylene oxides, and polypropylene oxides. Examples are 2-octylphenol and ammonium laurate.

Container:

Components such as activator, indicator, binder, nucleating agent etc. has to be enclosed in a container. The container should preferably be transparent so that the color change is readily visible when it occurs. Although vial type glass and plastic containers can be used, a preferred container is a flexible plastic pouch. Such a pouch can be created by joining/sealing the window and the base materials/films. It is preferred that container pouch be substantially impermeable to water, solvents/activators, liquids and additives. Impermeability to the activator, its solvent and water can be achieved by selecting the proper polymer, copolymer, graft copolymer and or by coating the film with a barrier coat or laminating with a film which is a thin barrier film. These materials are well known in the art and within the skill of the ordinary practitioner.

Variables:

The time and temperature required for the color change can be varied by varying (1) nature and concentration of indicator, such diacetylenes, (2) solubility of the indicator, such as nature and degree of polymerization of diacetylenes, (3) nature and concentration of activator and cosolvent and additives and (4) nature and concentration of binder. By varying the above, the color change can be obtained from 60° C. to −30° C.; from 10 seconds exposure to 1 day exposure below the threshold temperature, and gradual color change to abrupt color change.

Color Change at Higher Temperature:

The inventive device can also change color at a high temperature, such as above 60° C. Thus, visual inspection of the device in which a color change has occurred could present the question as to whether the color change is due to freezing or heating. This can be remedied by utilizing on the outside of the device a polyethylene strip of the same partially polymerized diacetylene. If this does not evidence a color change, as compared to the same unexposed starting diacetylene as a control, then one knows that the color change of the actual device is due to freezing and not heating.

Advantages of the Devices:

The inventive devices offer many major advantages over the other systems reported in the literature. The device changes color only if the solvent system freezes. The device does not change color if the mixture does not freeze. The color change is very dramatic and noticeable in going from blue-to-red. Other color changes, such as red-to-blue or red-to-yellow, can also be achieved by selecting proper compositions such as diacetylenes and solvent systems. The freezing temperature of the device can be altered with additives such as inorganic salts, soluble organic and inorganic compounds, and by altering the concentrations of activator, indicator and binder. Water is used as the preferred solvent and hence the most desired temperature range of about 0 to −30° C. can be monitored. Chemicals used in the device are nontoxic. The device is simple and easy to manufacture. The indicator and binder can be designed in a variety of readable forms. The device has a long shelf life. Fine particles of indicators can also act as a nucleating agent for rapid freezing. The color change can be relatively fast and dramatic. The color change can be seen while the system is still frozen or brought to room temperature. There is no need to wait for thawing to occur as with other prior art devices which require thawing for a visible color change. Time required for the color change can be varied by degree of partial polymerization, concentration of indicator, activator and binder.

The invention comprises nucleating agents, such as silver halides and dopped silver halides in a water-soluble polymer, wherein the suspension of silver halide nucleating agent is stabilized by selecting very high molecular weight water soluble polymers. The suspension of silver halide nucleating agent is stabilized by selecting water soluble polymers which form solid soft gel. The water-soluble polymers include agrose, dextran, gelatin, guar gum, gum xanthan, hydroxyethyl cellulose, polyacrylic acid, polyvinyl alcohol, polyacrylamide, polyethylene oxide, polyethylene glycol, polyvinyl pyrrolidone, starch and super absorbent polymers, such as 60 mol % graft copolymer of starch, polyacrylamide, acrylic acid sodium salts. The silver halide nucleating agents include, (i) silver iodide, silver bromide and silver chloride, (ii) co-crystallized silver halides, (iii) silver halides and co-crystallized silver halides co-doped with di or higher valent metal salts and (iv) mixture thereof.

The light sensitivity of silver halide nucleating agents is reduced by adding, co-crystallizing and/or co-doping with di or higher valent metal salts. The higher metal salts are aluminum, barium, calcium, copper, magnesium, nickel, tin and zinc.

Method of In-Situ Generation of Nucleating Agents

An exemplary method of in-situ making of nucleating agents from two or more reactants includes: (i) dissolving reactant-A or a mixture of reactants-A in one portion of a polymer solution in a solvent and (ii) dissolving counter reactant-B or a mixture of counter reactants-B in another portion of the same or another compatible polymer solution, and (iii) mixing dissolved reactant-A with dissolved reactant-B at a very high speed to prevent growth of large particles of the resultant nucleated agent or mixture thereof. It is preferable that the viscosity of polymer solutions for dissolved reactant-A and dissolved reactant-B are very high such a preferred 1,000 to 10,000 cP for this embodiment. It is preferable that the polymer solutions are solid gels. In one embodiment the polymers solutions are frozen and converted to small pieces. It is preferable that the polymers are water soluble and the solvent is water.

Another method of in-situ making of silver halides nucleating agents from two or more reactants includes: (i) dissolving a silver salt or a mixture of silver salts in a first portion of a polymer solution in water and (ii) dissolving a halide salt of a non-silver metals of halide salts of non-silver metals a second portion of the same or another compatible polymer solution, and (iii) mixing the first portion and second portions at a very high speed to prevent growth of large particles of the resultant nucleating agent or mixture thereof of silver halide(s). In an embodiment the silver salt is silver nitrate and non-silver salt is alkali halides. In an embodiment the alkali salts are sodium or potassium chloride, bromide or iodide. In an embodiment the non-silver salts are di valent or higher valent halides. In another embodiment the divalent or higher valent metal halides are halides of aluminum, barium, calcium, copper, magnesium, nickel, tin and zinc.

In-situ generated silver halide nucleating agent nucleating agent is a mixture of silver halides preferably comprising silver iodide. In an embodiment the nucleating agent is a mixture comprising silver iodide and silver chloride. In an embodiment the nucleating agent is a mixture of silver iodide, silver chloride and a divalent or higher valent metal halide wherein the divalent or higher valent metal halide is that of aluminum, barium, calcium, copper, magnesium, nickel, tin and zinc.

EXAMPLES

The following Examples are illustrative of carrying out the invention and should not be construed as being limits on the scope and spirit of the instant invention.

Example 1: In-Situ Generation of Fine Crystals of Silver Iodide as a Nucleating Agent in Solution of Carboxy Methyl Cellulose (CMC) Containing Colloidal Cellulose Thirty grams of colloidal cellulose in high molecular weight carboxy methyl cellulose (CMC) having colloidal, nanometer sized cellulose particles (Avicel RC-591 NF, FMC Biopolymers, Philadelphia, Pa.) was dissolved in 500 g deionized (DI) water in a 2-liter beaker under vigorous high-speed stirring at room temperature to make CMC solution. The solution was almost clear and very viscous like honey. About 100 g of the CMC solution was taken out for a control experiment. To the 200 g solution of CMC in a one-liter beaker was added 0.5 g silver nitrate and dissolved by stirring. To another 200 g of the CMC solution in a 500 ml beaker was added 0.55 g potassium iodide and stirred to dissolve. The solution was almost clear and very viscous like honey. The 200 g of CMC solution containing potassium iodide was softly added on to 200 g of CMC solution containing silver nitrate in a one-liter beaker. As the solutions were very thick, viscous, there was very little reaction as judged from development of a thin light-yellow color boundary. The content was stirred/mixed at a high speed of 20,000 rpm for a couple of minutes with a high-speed homogenizer using a milling mixing blade. The mixture was light yellow in color and the temperature was about 50° C. The solution became almost transparent after a while. This dispersion has two types of fine particles, the original colloidal, nanometer sized, particles of cellulose and fine particles of silver iodide.

Example 2: In-Situ Generation of Fine Crystals of Silver Iodide Only as a Nucleating Agent in Solution of Other Water-Soluble Polymers Using the procedure of Example 1, fine particles of silver iodide were prepared in aqueous solution of other polymers, such as polyvinyl alcohol, hydroxyethyl cellulose, starch, agar, gelatin and polyethylene oxide. The gels were almost clear and when viewed under an optical microscope under high magnification (×400) the particles of silver iodide were barely visible indicating sub-micron sized particles. As these solutions did not have any other nanocrystals to begin with, the resultant dispersion had fine particles of silver iodide only.

Example 3: Freezing Points of Water, CMC Colloidal Solution and CMC Colloidal Solution Containing Particles of Silver Iodide as a Nucleating Agent About (i) 5 g of DI water only, (ii) 5 g of viscous solution of colloidal cellulose in CMC/water of Example 1 and (iii) 5 g of viscous solution of colloidal cellulose in CMC/water containing fine crystals of silver iodide of Example 1 were taken in 15 mm×85 mm test tubes. The test tubes were placed in a low temperature water/ethylene glycol bath and temperature was lowered from room temperature to minus 15° C. and any freezing of the solutions was noted. The water only sample froze at about minus 9° C. in about five minutes, the colloidal CMC solution froze at about minus 7° C. after about five minutes and the sample having fine particles of silver iodide became solid at minus 5° C. in a few minutes. The solutions containing silver iodide crystals turned faint gray color after a week of exposure to ambient lights.

The freezing temperatures were lower by one to two degrees centigrade when narrow test tubes, 6 mm×50 mm, were used instead of wider test tubes, 15 mm×85 mm.

Example 4: In-Situ Generation of Fine Dispersion of Silver Iodide as a Nucleating Agent in Solution of Carboxy Methyl Cellulose (CMC) without Colloidal Cellulose Using the procedure of Example 1, fine dispersion of silver iodide was prepared in 2 wt % aqueous solution of CMC obtained from Sigma Aldrich as carboxymethylcellulose sodium salt, Catalog #5013. This very viscous solution containing silver iodide froze at about minus 6° C. within a few minutes.

Example 5: Co-Crystallization/Doping of Silver Iodide Crystals with Silver Chloride as a Nucleating Agent In some experiments similar to Example 1, a small portion, from 1 to 30 wt %, of potassium iodide was replaced with potassium chloride to get finely co-crystallized/doped, AgICl (silver iodide chloride), nucleating agents in polymeric binders such as polyvinyl alcohol, hydroxyethyl cellulose, starch, agar, gelatin and polyethylene oxide. The soft gels and the solutions of the binders froze at minus 6° C. and was relatively less sensitive to visible and UV light, developed barely noticeable faint gray color even after a couple of weeks under ambient lights.

Example 6: Co-Crystallization/Doping of Silver Iodide Crystals with Other Metals as Nucleating Agents To further reduce the light sensitivity of silver iodide and silver iodide chloride crystals, they were further doped with some other metals such as aluminum, barium, calcium, copper, magnesium, nickel, tin and zinc. In experiments similar to Example 1, a small portion, from 1 to 10 wt %, of potassium iodide and/or potassium chloride were replaced with one or more of aluminum bromide, aluminum chloride, aluminum iodide, copper bromide, copper chloride, copper iodide, magnesium chloride, magnesium iodide, zinc bromide, zinc chloride and zinc iodide in solution of CMC and other polymeric binders such as polyethylene oxide and hydroxyethyl cellulose. The concentration of di and higher valent metals were kept usually low, below about 10 wt %.

Example 7: UV Insensitivity of Silver Iodide Crystals Doped with Silver Chloride and Calcium Chloride The polymer solution having fine crystals of silver iodide chloride doped with a few percent of aluminum chloride, calcium chloride, copper bromide, magnesium chloride, zinc bromide and zinc chloride in CMC of Example 6, did not develop gray color when exposed UV light or left under ambient light for a week.

Example 8: Raising Freezing Point with Heavy Water ($D_2O$)

Six grams of colloidal cellulose in high molecular weight carboxy methyl cellulose (CMC) having colloidal, nanometer sized cellulose particles (Avicel RC-591 NF, FMC Biopolymers, Philadelphia Pa.), was dissolved in 100 g of 70 wt % heavy water in a 500 ml beaker under vigorous high-speed stirring at room temperature to make CMC solution. To the 40 g solution of CMC in a 250 ml beaker was added 0.1 g silver nitrate and dissolved by stirring. To another 40 g of the CMC solution in a 100 ml beaker was added 0.11 g potassium iodide and stirred to dissolve. The solutions were almost clear and very viscous like honey. The 40 g of CMC solution containing potassium iodide was softly added on to 40 g of CMC solution containing silver nitrate in a one-liter beaker. The content was stirred/mixed at a high speed (20 k rpm) for a couple of minutes with a high-speed homogenizer using a small milling mixing blade. A few ml of this heavy water solution with silver iodide crystals was taken in a test tube and place in a cold bath. The solution froze at 1° C. within a couple of minutes.

Example 9: Generating Fine Particles of Silver Iodide by Mixing Solid Soft Gels of a Binder A 2 wt % percent solution of agar was prepared by dissolving 20 g of agar in 1 liter of DI water at 80° C. The solution was divided into two equal parts. In one part 2.5 g of silver nitrate was dissolved and cooled to room temperature. In the other part 2.7 g of potassium iodide was dissolved and cooled to room temperature. Both the solutions turned into solid soft gels. Both gels were cut in to small pieces, placed in a 4-liter beaker and stirred at high speed with a high-speed homogenizer while being heated. The gels turned in to a light yellow dispersion/solution. The solution was allowed to cool to room temperature to form a solid soft gel. This gel became rocky hard at minus 6° C. in a couple of minutes while the gel without silver iodide did not become rocky hard till about minus 10° C. in a cold bath.

Example 10: Silver Iodide Crystals without a Polymeric Binder

A 2.5 g of silver nitrate was dissolved in 100 g of DI water, poured in ice-cube tray and placed in a freezer to make ice cubes. Similarly, A 2.7 g of potassium iodide was dissolved in 100 g of DI water, poured in ice-cube tray and placed in a freezer to make ice cubes. The ice cubes were removed from the tray and crushed to small pieces. In a 1-liter stainless steel beaker, were added 200 g of ice-cold DI water (~4° C.), crushed ice of silver nitrate and that of potassium iodide having temperature of about minus 15° C., were added and quickly mixed at a very high speed with a high-speed homogenizer. The mixture turned in to a light yellow dispersion as the ice pieces melted and silver nitrate reacted with potassium iodide to form fine crystals of silver iodide. The yellow particles settled at the bottom of the solution.

Example 11: Freeze Indicator with Fine Particles of Silver Iodide as Nucleating Agent 0.2 g of a diacetylene, 4BCMU (R—C≡C—C≡C—R, where R is $(CH_2)_4OCONHCH_2COO(CH_2)_3CH_3$) was dissolved in 7 g of ethylene glycol diacetate. 4BCMU is an indicator and ethylene glycol diacetate is an activator. This solution of 4BCMU was added in 100 g of hot (80° C.) faint yellow color solution of colloidal cellulose in CMC of Experiment 1 under moderate stirring followed by high-speed stirring (20 k rpm) for one minute. The hot mixture was slowly poured into about 500 g liquid nitrogen in a two-liter insulated beaker under moderate stirring. The mixture became white solid particles. Excess liquid nitrogen was allowed to evaporate and the mass was allowed to come to room temperature. About 1 gram of the dispersion (freeze indicating formulation) was placed in a polyethylene bag, placed between two glass plates with a spacer of 500 microns and thinned by applying pressure. The bag was exposed to short wavelength (254 nm) UV light. The viscous gel turned bright blue. When placed in a freezer at minus 10° C. the content changed to red in less than one minute. When another bag was placed in a cold bath, the bag changed from blue-to-red within a couple of minutes at minus 5° C.

When the above mixture was prepared in 70 wt % heavy water, the blue-to-red color change occurred at about minus 1° C.

The freeze indicating devices similar to this experiment were also made in binders such as polyvinyl alcohol, hydroxyethyl cellulose, starch, agar, gelatin and polyethylene oxide and the activators such as 1-hexanol, 2-cyclohexen-1-one, 4-methylcyclohexanone, benzyl ether, butyl acetate, butyl nitrite, cycloheptanone, cyclohexanone, cyclopentanone, dibutyl adipate, diethyl 1-tartrate, diethyl maleate, diethyl malonate, diethyl oxalate, diethyl phthlate, dimethyl maleate, dimethyl malonate, e, ethylene glycol diacetate and n-butyl I-lactate.

Some of these freeze indicating formulations, both with and without pre-exposed to UV light, stores in closed glass jars for five years in a refrigerator (~7° C.) were stable and still very effective, i.e., showed color change from blue-to-red within a couple of minutes at about minus 6° C. There was no fungus on the sample stored for five years.

Example 12: Freeze Indicator without Silver Iodide as Nucleating Agent 0.2 g of a diacetylene, 4BCMU (R—C≡C—C≡C—R, where R is $(CH_2)_4OCONHCH_2COO(CH_2)_3CH_3$) was dissolved in 7 g of ethylene glycol diacetate. This solution was added in 100 g of solution of hot (80° C.) solution of CMC of Experiment 4 (i.e., without silver iodide) under moderate stirring followed by high-speed stirring (20 k rpm) for one minute. The hot mixture was slowly poured into about 500 g liquid nitrogen in a two-liter insulated beaker under moderate stirring. The mixture became solid particles. Excess liquid nitrogen was allowed to evaporate and allowed to come to room temperature. About 1 gram of the dispersion was placed in a polyethylene bag, placed between two glass plates with a spacer of about 500 microns and thinned by applying pressure. The bag was exposed to short wavelength UV light. The gel turned bright blue. When placed in a freezer at minus 10° C. the content changed to red after about twenty minutes. When another bag was placed in a cold water bath, the bag changed from blue-to-red within about ten minutes at minus 10° C.

The invention has been described with reference to preferred embodiments without limit thereto. One of skill in the art would realize additional embodiments which are described and set forth in the claims appended hereto.

The invention claimed is:

1. A nucleating agent composition comprising:
crystals of a nucleating agent comprising silver halide salt with an average particle size of at least 10 nanometer to no more than 100 microns in a polymeric matrix wherein said polymeric matrix has a viscosity of at least 500 cP to no more than 50,000 cP wherein said crystals further comprises at least one of a doping anion or doping cation.

2. The nucleating agent composition of claim 1 wherein said nucleating agent composition does not comprise an imaging dye.

3. The nucleating agent composition of claim 1 wherein said polymeric matrix has a viscosity of at least 1,000 cP to no more than 20,000 cP.

4. The nucleating agent composition of claim 3 wherein said polymeric matrix has a viscosity of at least 5,000 cP to no more than 20,000 cP.

5. The nucleating agent composition of claim 3 wherein said polymeric matrix has a viscosity of at least 1,000 cP to no more than 10,000 cP.

6. The nucleating agent composition of claim 1 wherein said silver halide has an average particle size of at least 10 nm to no more than 10 microns.

7. The nucleating agent composition of claim 6 wherein said silver halide has an average particle size of at least 10 nm to no more than 1 micron.

8. The nucleating agent composition of claim 1 wherein said polymeric matrix comprises at least one polymer selected from the group consisting of polyvinyl alcohol, polyacrylamide, polyacrylic acid, polyvinylpyrrolidone, polyethylene glycol, polyethylene oxide, hydroxyethyl cellulose, carboxymethyl cellulose, starch, agar, agrose, dextran, guar gum, gelatin, carrageenan, gum ghatti, gum karaya, gum tragacanth, locust bean gum, pectin and xanthan gum.

9. The nucleating agent composition of claim 1 wherein said silver halide salt comprises silver iodide doped with chloride or bromide.

10. The nucleating agent composition of claim 1 wherein said doping anion is selected from the group consisting of alkali metal, alkaline earth metal, transition metal, post transition metal, lanthanide and actinide metal.

11. The nucleating agent composition of claim 10 wherein said doping anion is selected from the group consisting of aluminum, tin, zinc, copper, manganese, magnesium, nickel, cobalt, iron, sodium, potassium, lithium, calcium, gallium, cesium, chromium, germanium, indium, platinum and gold.

12. The nucleating agent composition of claim 1 wherein said doping cation is selected from an organic dopant and an inorganic dopant.

13. The nucleating agent composition of claim 1 wherein said doping cation is water insoluble.

14. The nucleating agent composition of claim 13 wherein said doping cation is selected from the group consisting of carbonate, phosphate and sulfate.

* * * * *